United States Patent
Wall et al.

(10) Patent No.: US 6,784,565 B2
(45) Date of Patent: Aug. 31, 2004

(54) TURBOGENERATOR WITH ELECTRICAL BRAKE

(75) Inventors: Simon Wall, Thousand Oaks, CA (US); Brian Dickey, Simi Valley, CA (US); Guillermo Pont, Los Angeles, CA (US)

(73) Assignee: Capstone Turbine Corporation, Chatsworth, CA (US)

(*) Notice: Subject to any disclaimer, the term of this patent is extended or adjusted under 35 U.S.C. 154(b) by 68 days.

(21) Appl. No.: 10/077,121

(22) Filed: Feb. 15, 2002

(65) Prior Publication Data

US 2002/0190695 A1 Dec. 19, 2002

Related U.S. Application Data

(63) Continuation-in-part of application No. 09/207,817, filed on Dec. 8, 1998, now Pat. No. 6,487,096, and a continuation-in-part of application No. 08/924,966, filed on Sep. 8, 1997, now Pat. No. 5,903,116, and a continuation-in-part of application No. 09/003,078, filed on Jan. 5, 1998, now Pat. No. 6,031,294, application No. 10/077,121.
(60) Provisional application No. 60/080,457, filed on Apr. 2, 1998, provisional application No. 60/269,546, filed on Feb. 16, 2001, and provisional application No. 60/276,354, filed on Mar. 16, 2001.

(51) Int. Cl.$^7$ ............................................. F02N 11/00
(52) U.S. Cl. .................................................... 290/52
(58) Field of Search ............................ 290/52, 7, 14; F02N 11/00

(56) References Cited

U.S. PATENT DOCUMENTS

| 2,864,244 | A | | 12/1958 | Prachar |
| 2,910,054 | A | * | 10/1959 | Schutte ..................... 123/484 |
| 3,124,924 | A | | 3/1964 | Smith |
| 3,250,973 | A | | 5/1966 | Dawson |
| 3,569,809 | A | | 3/1971 | Comer |
| 3,591,844 | A | | 7/1971 | Schonebeck |
| 3,703,076 | A | | 11/1972 | Hagemeister |
| 3,724,214 | A | | 4/1973 | Bryant |
| 3,764,815 | A | | 10/1973 | Habock et al. |

(List continued on next page.)

FOREIGN PATENT DOCUMENTS

| DE | 3634328 | 4/1987 |
| DE | 19704662 | 8/1998 |
| EP | 0 472 294 | 2/1992 |

(List continued on next page.)

OTHER PUBLICATIONS

Japanese Patent Abstract entitled "Method and Equipment for Controlling Permanent Magnet Turbine Generator/Motor"; filed May 13, 1999, Japanese Application No. 11–133003.

(List continued on next page.)

*Primary Examiner*—Nicholas Ponomarenko
*Assistant Examiner*—Karen Addison
(74) *Attorney, Agent, or Firm*—Sterne, Kessler, Goldstein & Fox P.L.L.C.

(57) ABSTRACT

In an integrated turbogenerator system having an air intake for a compressor to supply combustion air to a combustor, an electric brake device such as a resistor is connected to the electrical power output of the turbogenerator and is situated in the air intake to be cooled by the stream of combustion air flowing into the intake. When load transients require unloading excess electrical power produced by the turbogenerator, the brake resistor is supplied with at least part of the excess electrical power to create heat energy and thereby heat the in-flowing combustion air to lower the combustor efficiency, turbogenerator power produced, and excess electric power to be unloaded. An algorithm may be provided for controlling the turbogenerator speed deceleration rate to maintain the brake resistor at or near a physical temperature limit.

11 Claims, 19 Drawing Sheets

U.S. PATENT DOCUMENTS

| | | |
|---|---|---|
| 3,809,914 A | 5/1974 | Kilgora et al. |
| 3,829,758 A | 8/1974 | Sludtmann |
| 3,937,974 A | 2/1976 | Lafuze |
| 3,991,357 A | 11/1976 | Kaminski |
| 4,005,581 A | 2/1977 | Aanstad |
| 4,015,187 A | 3/1977 | Sasaki et al. |
| 4,039,914 A | 8/1977 | Steigerwald et al. |
| 4,093,869 A | 6/1978 | Hoffmann et al. |
| 4,119,861 A | 10/1978 | Gocho |
| 4,258,424 A | 3/1981 | Giras et al. |
| 4,265,099 A | 5/1981 | Johnson et al. |
| 4,292,534 A | 9/1981 | Diegel et al. |
| 4,340,820 A | 7/1982 | Meyer-Pittroff et al. |
| 4,401,938 A | 8/1983 | Cronin |
| 4,442,385 A | 4/1984 | Van Sickle |
| 4,471,229 A | 9/1984 | Plohn et al. |
| 4,481,459 A | 11/1984 | Mehl et al. |
| 4,498,551 A | 2/1985 | Arbisi |
| 4,551,980 A | 11/1985 | Bronicki |
| 4,560,364 A | 12/1985 | Cohen |
| 4,565,957 A | 1/1986 | Gary et al. |
| 4,684,814 A | 8/1987 | Radomski |
| 4,709,318 A | 11/1987 | Gephart et al. |
| 4,719,550 A | 1/1988 | Powell et al. |
| 4,730,397 A | 3/1988 | Weiford et al. |
| 4,754,607 A | 7/1988 | Mackay |
| 4,757,686 A | 7/1988 | Kawamura et al. |
| 4,772,802 A | 9/1988 | Glennon et al. |
| 4,786,852 A | 11/1988 | Cook |
| 4,802,882 A | 2/1989 | Heidrich |
| 4,830,412 A | 5/1989 | Raad et al. |
| 4,833,887 A | 5/1989 | Kawamura et al. |
| 4,841,216 A | 6/1989 | Okada et al. |
| 4,862,009 A | 8/1989 | King |
| 4,883,973 A | 11/1989 | Lakey et al. |
| 4,908,565 A | 3/1990 | Cook et al. |
| 4,939,441 A | 7/1990 | Dhyanchand |
| 4,955,199 A | 9/1990 | Kawamura |
| 4,967,096 A | 10/1990 | Diemer et al. |
| 4,968,926 A | 11/1990 | Dhyanchand |
| 4,982,569 A | 1/1991 | Bronicki |
| 5,013,929 A | 5/1991 | Dhyanchand |
| 5,015,941 A | 5/1991 | Dhyanchand |
| 5,029,062 A | 7/1991 | Capel |
| 5,038,566 A | 8/1991 | Hara |
| 5,055,764 A | 10/1991 | Rozman et al. |
| 5,057,763 A | 10/1991 | Torii et al. |
| 5,068,590 A | 11/1991 | Glennon et al. |
| 5,088,286 A | 2/1992 | Muraji |
| 5,097,195 A | 3/1992 | Raad et al. |
| 5,115,183 A | 5/1992 | Kyoukane et al. |
| 5,158,504 A | 10/1992 | Stocco |
| 5,191,520 A | 3/1993 | Eckersley |
| 5,214,371 A | 5/1993 | Naidu |
| 5,237,260 A | 8/1993 | Takakado et al. |
| 5,250,890 A | 10/1993 | Tanamachi et al. |
| 5,252,860 A | 10/1993 | McCarty et al. |
| 5,260,637 A | 11/1993 | Pizzi |
| 5,281,905 A | 1/1994 | Dhyanchand et al. |
| 5,291,106 A | 3/1994 | Murty et al. |
| 5,309,081 A | 5/1994 | Shah et al. |
| 5,325,043 A | 6/1994 | Parro |
| 5,345,154 A | 9/1994 | King |
| 5,363,032 A | 11/1994 | Hanson et al. |
| 5,364,309 A | 11/1994 | Heidrich et al. |
| 5,373,195 A | 12/1994 | De Doncker et al. |
| 5,381,081 A | 1/1995 | Radun |
| 5,387,859 A | 2/1995 | Murugan et al. |
| 5,404,092 A | 4/1995 | Gegner |
| 5,406,797 A | 4/1995 | Kawamura |
| 5,428,275 A | 6/1995 | Carr et al. |
| 5,430,362 A | 7/1995 | Carr et al. |
| 5,477,091 A | 12/1995 | Fiorina et al. |
| 5,488,286 A | 1/1996 | Rozman et al. |
| 5,495,162 A | 2/1996 | Rozman et al. |
| 5,495,163 A | 2/1996 | Rozman et al. |
| 5,510,696 A | 4/1996 | Naidu et al. |
| 5,512,811 A | 4/1996 | Latos et al. |
| 5,544,484 A | 8/1996 | Voss et al. |
| 5,545,090 A | 8/1996 | Kirschey |
| 5,546,742 A | 8/1996 | Shekhawat et al. |
| 5,550,410 A | 8/1996 | Titus |
| 5,550,455 A | 8/1996 | Baker |
| 5,559,421 A | 9/1996 | Miyakawa |
| 5,563,802 A | 10/1996 | Plahn et al. |
| 5,568,023 A | 10/1996 | Grayer et al. |
| 5,572,108 A | 11/1996 | Windes |
| 5,581,168 A | 12/1996 | Rozman et al. |
| 5,587,647 A | 12/1996 | Bansal et al. |
| 5,594,322 A | 1/1997 | Rozman et al. |
| 5,637,987 A | 6/1997 | Fattic et al. |
| 5,646,458 A | 7/1997 | Bowyer et al. |
| 5,656,915 A | 8/1997 | Eaves |
| 5,743,227 A | 4/1998 | Jacquet et al. |
| 5,767,637 A | 6/1998 | Lansberry |
| 5,789,881 A | 8/1998 | Egami et al. |
| 5,799,484 A | 9/1998 | Nims |
| 5,819,524 A | 10/1998 | Bosley et al. |
| 5,847,522 A | 12/1998 | Barba |
| 5,903,116 A | 5/1999 | Geis et al. |
| 5,905,346 A | 5/1999 | Yamada et al. |
| 5,929,537 A | 7/1999 | Glennon |
| 5,936,312 A | 8/1999 | Koide et al. |
| 5,939,794 A | 8/1999 | Sakai et al. |
| 5,946,086 A | 8/1999 | Bruce |
| 5,982,645 A | 11/1999 | Levran et al. |
| 5,998,976 A | 12/1999 | Steffan |
| 6,005,297 A | 12/1999 | Sasaki et al. |
| 6,020,713 A | 2/2000 | Geis et al. |
| 6,023,135 A * | 2/2000 | Gilbreth et al. ............... 290/52 |
| 6,031,294 A | 2/2000 | Geis et al. |
| 6,051,951 A | 4/2000 | Arai et al. |
| 6,054,776 A | 4/2000 | Sumi |
| 6,064,122 A | 5/2000 | McConnell |
| 6,087,734 A | 7/2000 | Maeda et al. |
| 6,107,775 A | 8/2000 | Rice et al. |
| 6,147,414 A | 11/2000 | McConnell et al. |
| 6,153,942 A | 11/2000 | Roseman et al. |
| 6,169,332 B1 * | 1/2001 | Taylor et al. ............. 290/40 R |
| 6,169,334 B1 | 1/2001 | Edelman |
| 6,175,210 B1 | 1/2001 | Schwartz et al. |
| 6,194,794 B1 | 2/2001 | Lampe et al. |
| 6,274,945 B1 * | 8/2001 | Gilbreth et al. ............... 290/52 |
| 6,323,625 B1 | 11/2001 | Bhargava |
| 6,487,096 B1 * | 11/2002 | Gilbreth et al. ............... 363/35 |
| 6,552,440 B2 * | 4/2003 | Gilbreth et al. ............... 290/52 |

FOREIGN PATENT DOCUMENTS

| | | |
|---|---|---|
| EP | 0 679 800 | 11/1995 |
| EP | 0 837 231 | 4/1998 |
| EP | 0 901 218 | 3/1999 |
| FR | 1453862 | 4/1965 |
| FR | 2395316 | 1/1979 |
| JP | 52-60924 | 5/1977 |
| WO | WO 94/27359 | 11/1994 |
| WO | WO 98/25014 | 6/1998 |
| WO | WO 99/32762 | 7/1999 |
| WO | WO 99/52193 | 10/1999 |
| WO | WO 00/28191 | 5/2000 |

OTHER PUBLICATIONS

Japanese Patent Abstract entitled "Command and Control System Method for Multiturbo Generators", filed Oct. 27, 1999, Japanese Application No. 11–305375.

Japanese Patent Abstract entitled "Turbine Generator–Motor Controller", filed Aug. 4, 1998, Japanese Application No. 10–220231.

German Patent Abstract entitled "Control Circuit for Turbine AC Motor–Generator"; for DE 3634328 (Apr. 1987).

German Patent Abstract entitled "Load Symmetrising e.g. for Several Power Supply Modules Including Recitifer Modules";for DE 19704662 (Aug. 1998).

French Patent Abstract entitled "Control System for Turbine Driven by Blast Furnace Throat Gas"; for FR 2395316 (Jan. 1979).

Japanese Patent Abstract entitled "Control Circuit in Permanent Magnet Motor"; for JP Publication No. 52–60924 (May 1977).

* cited by examiner

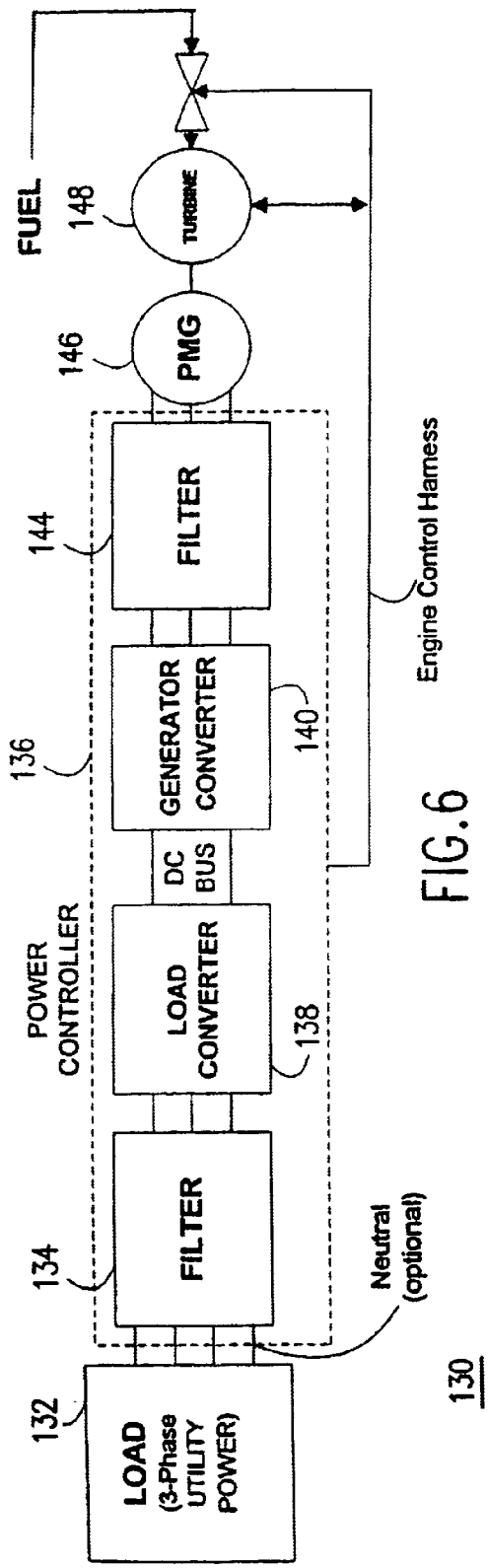

TURBOGENERATOR WITH ELECTRICAL BRAKE

CROSS REFERENCE TO RELATED APPLICATIONS

This application is a continuation-in-part of U.S. patent application Ser. No. 09/207,817 filed on Dec. 8, 1998, now U.S. Pat. No. 6,487,096, which claims the benefit of U.S. Provisional Application No. 60/080,457, filed on Apr. 2, 1998 and is also a continuation-in-part of U.S. patent applications Ser. No. 08/924,966 filed Sep. 8, 1997 and now U.S. Pat. No. 5,903,116 and Ser. No. 09/003,078 filed Jan. 5, 1998 and now U.S. Pat. No. 6,031,294. This application also claims the priority of U.S. provisional patent application Serial No. 60/269,546 filed Feb. 16, 2001 and U.S. provisional patent application Serial No. 60/276,354 filed Mar. 16, 2001. All of the priority applications listed above are incorporated herein in their entirety by reference thereto.

BACKGROUND OF THE INVENTION

This invention relates to turbogenerators, and more specifically to electrical braking systems and associated control algorithms for integrated turbogenerators. Conventional integrated turbogenerator systems can become unstable during transient operating conditions. Known techniques for enhancing stability often lead to inefficient operation. What is now needed is a technique for ensuring stable operation of integrated turbogenerators while minimizing associated inefficiencies.

SUMMARY OF THE INVENTION

In one aspect, the present invention provides an integrated turbogenerator system comprising a turbine, a compressor rotationally coupled to the turbine for rotating therewith to generate compressed air, a combustor fluidly coupled to the compressor for combusting fuel and the compressed air therein to generate exhaust gas to drive the turbine, a generator rotationally coupled to the turbine for rotating therewith to generate electric power, and an electrically resistive device connected to the generator to selectively dissipate a portion of the generated power.

In another aspect of the present invention, the compressor further comprises an air intake disposed in a preselected relationship to the resistive device to channel air over the resistive device and into the compressor. The electrically resistive device may connected to the generator to selectively dissipate a portion of the generated power as thermal energy in the air channeled into the compressor.

In a further aspect of the present invention, the turbogenerator system also comprises a controller connected to the generator and to the resistive device to selectively supply a portion of the generated power from the generator to the resistive device. The controller may supply a portion of the generated power from the generator to the resistive device in accordance with variations in a load on the generator. The controller may also control the speed of the turbine in accordance with variations in the load, and/or in accordance with a temperature of the resistive device, such as to maintain a temperature of the resistive device below a preselected value.

In yet another aspect of the invention, the controller reduces the speed of the turbine in response to a reduction in the load and supplies at least a portion of any generated power in excess of the load to the resistive device, the controller reducing the turbine speed at a rate selected to maintain a temperature of the resistive device below a preselected value.

These and other features and advantages of this invention will become further apparent from the detailed description and accompanying figures that follow. In the figures and description, numerals indicate the various features of the invention, like numerals referring to like features throughout both the drawing figures and the written description.

BRIEF DESCRIPTION OF THE DRAWINGS

FIG. 6 is a functional block diagram of an interface between load/utility grid and turbine generator using the power controller according to the present invention.

FIG. 7 is a functional block diagram of an interface between load/utility grid and turbine generator using the power controller for a stand-alone application according to the present invention.

DETAILED DESCRIPTION OF THE INVENTION

Figure 1:
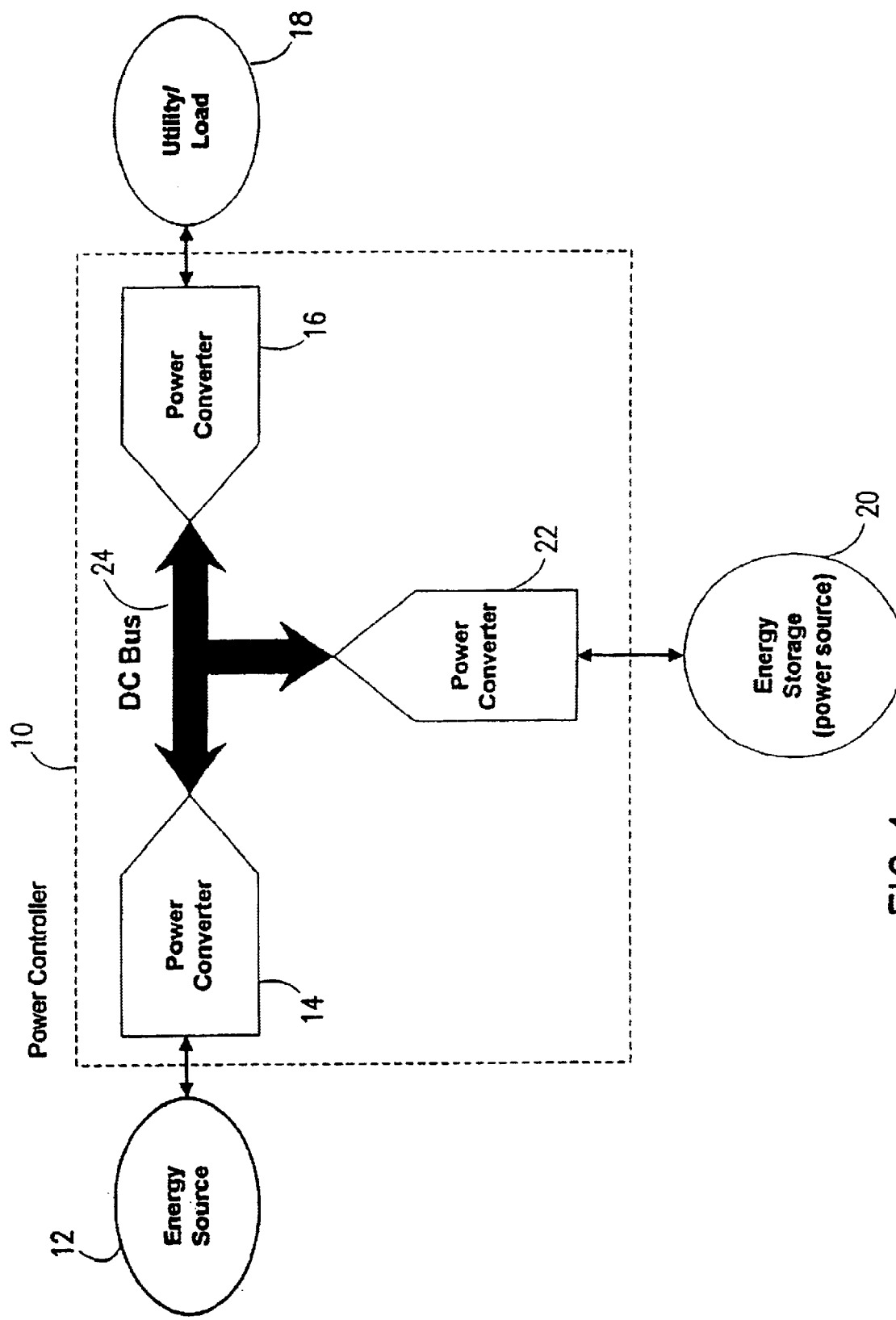
FIG. 1 is a block diagram of a power controller for a turbogenerator according to the present invention.

Referring to FIG. 1, power controller 10 which bi-directional, or reconfigurable, power converters 14, 16 and 22 used with a common DC bus 24 for permitting compatibility between one or more energy components 12, 18 and/or 22. Each power converter 14, 16 and 22 operates essentially as a customized bi-directional switching converter configured, under the control of power controller 10, to provide an interface for a specific energy component 12, 18 or 20 to DC bus 24. Power controller 10 controls the way in which each energy component 12, 18 or 20, at any moment, will sink or source power, and the manner in which DC bus 24 is regulated. In this way, various energy components can be used to supply, store and/or use power in an efficient manner.

Energy source 12 may be a turbogenerator system, photovoltaics, wind turbine or any other conventional or newly developed source. Energy storage/power source 20 may be a flywheel, battery, ultracapacitor or any other conventional or newly developed energy storage device. Utility/load 18 may be an utility grid, dc load, drive motor or any other conventional or newly developed utility/load 18.

Figure 2:
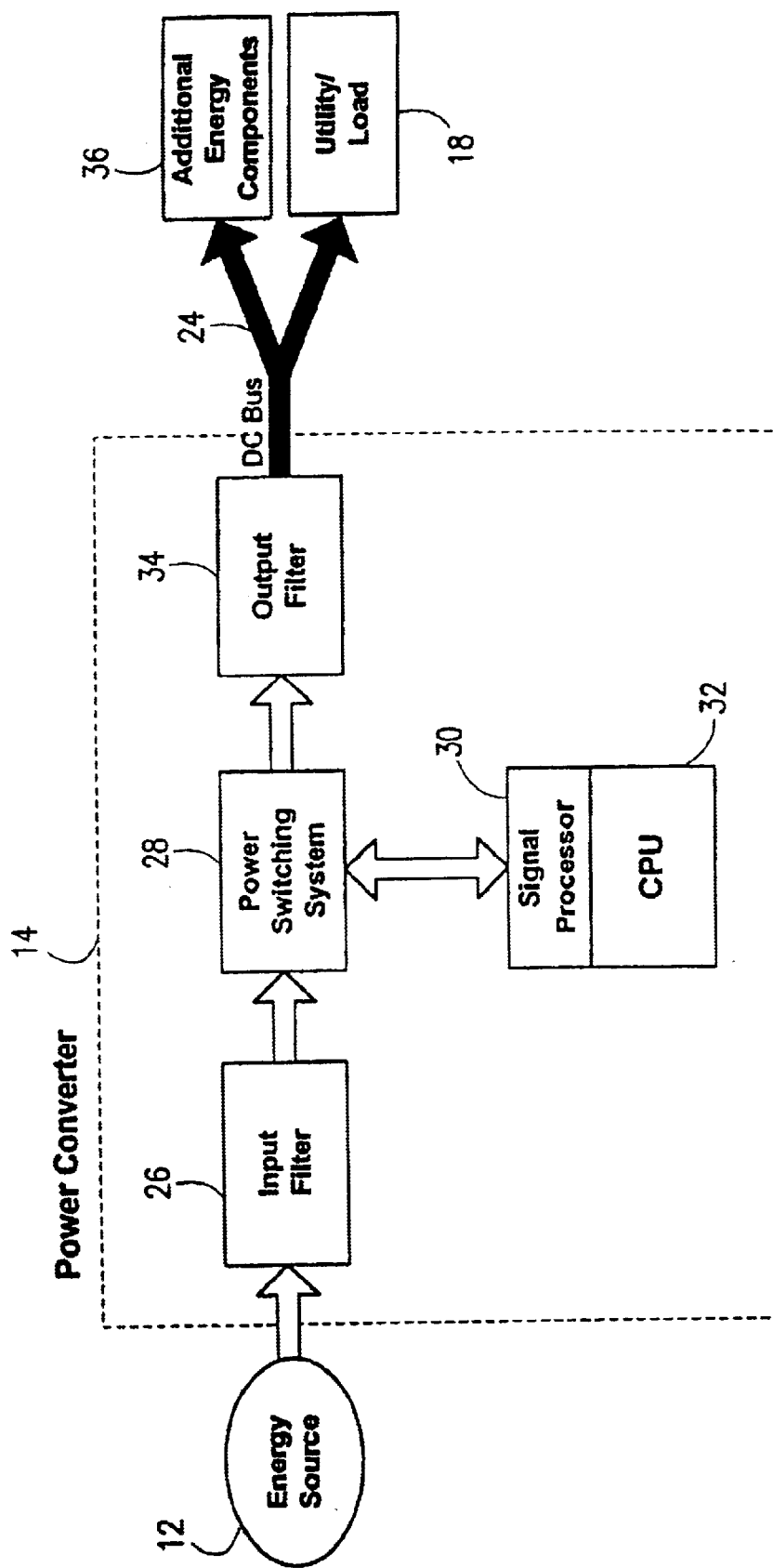
FIG. 2 is a detailed block diagram of power converter 14 in the power controller 10 illustrated in FIG. 1.

Referring now also to FIG. 2, a detailed block diagram of power converter 14 shown in FIG. 1, is illustrated. Energy source 12 is connected to DC bus 24 via power converter 14. Energy source 12 may be, for example, a turbogenerator including a gas turbine driving an AC generator to produce AC which is applied to power converter 14. DC bus 24 connects power converter 14 to utility/load 18 and additional energy components 36. Power converter 14 includes input filter 26, power switching system 28, output filter 34, signal processor 30 and main CPU 32. In operation, energy source 12 applies AC to input filter 26 in power converter 14. The filtered AC is then applied to power switching system 28 which may conveniently include a series of insulated gate bipolar transistor (IGBT) switches operating under the control of signal processor (SP) 30 which is controlled by main CPU 32. One skilled in the art will recognize that other conventional or newly developed switches may be utilized as well. The output of the power switching system 28 is applied to output filter 34 which then applies the filtered DC to DC bus 24.

In accordance with the present invention, each power converter 14, 16 and 22 operates essentially as a customized, bi-directional switching converter under the control of main CPU 32, which uses SP 30 to perform its operations. Main CPU 32 provides both local control and sufficient intelligence to form a distributed processing system. Each power converter 14, 16 and 22 is tailored to provide an interface for a specific energy component to DC bus 24.

Main CPU 32 controls the way in which each energy component 12, 18 and 20 sinks or sources power, and the way in which DC bus 24 is regulated at any time. In particular, main CPU 32 reconfigures the power converters 14, 16 and 22 into different configurations for different modes of operation. In this way, various energy components 12, 18 and 20 can be used to supply, store and/or use power in an efficient manner.

In the case of a turbogenerator, for example, power controller 10 may regulate bus voltage independently of turbine speed.

FIG. 1 shows a system topography in which DC bus 24, which may be regulated at 800 v DC for example, is at the center of a star pattern network. In general, energy source 12 provides power to DC bus 24 via power converter 14 during normal power generation mode. Similarly, during normal power generation mode, power converter 16 converts the power on DC bus 24 to the form required by utility/load 18, which may be any type of load including a utility web. During other modes of operation, such as utility start up, power converters 14 and 16 may be controlled by the main processor to operate in different manners.

For example, energy may be needed during start up to start a prime mover, such as a turbine engine in a turbogenerator included in energy source 12. This energy may come from load/utility grid 18 (during utility start up) or from energy storage/power source 20 (during battery start up), such as a battery, flywheel or ultra-cap.

During utility start up, power converter 16 applies power from utility/oad 18 to DC bus 24. Power converter 14 applies power from DC bus 24 to energy source 12 for startup. During utility start up, a turbine engine of a turbogenerator in energy source 12 may be controlled in a local feedback loop to maintain the turbine engine speed, typically in revolutions per minute (RPM). Energy storage/power source 20, such as a battery, may be disconnected from DC bus 24 while load/utility grid 18 regulates $V_{DC}$ on DC bus 24.

Similarly, in battery start up mode, the power applied to DC bus 24 from which energy source 12 is started may be provided by energy storage/power source 20 which may be a flywheel, battery or similar device. Energy storage/power source 20 has its own power conversion circuit in power converter 22, which limits the surge current into DC bus 24 capacitors, and allows enough power to flow to DC Bus 24 to start energy source 12. In particular, power converter 16 isolates DC bus 24 so that power converter 14 can provide the required starting power from DC bus 24 to energy source 12.

Figure 3:
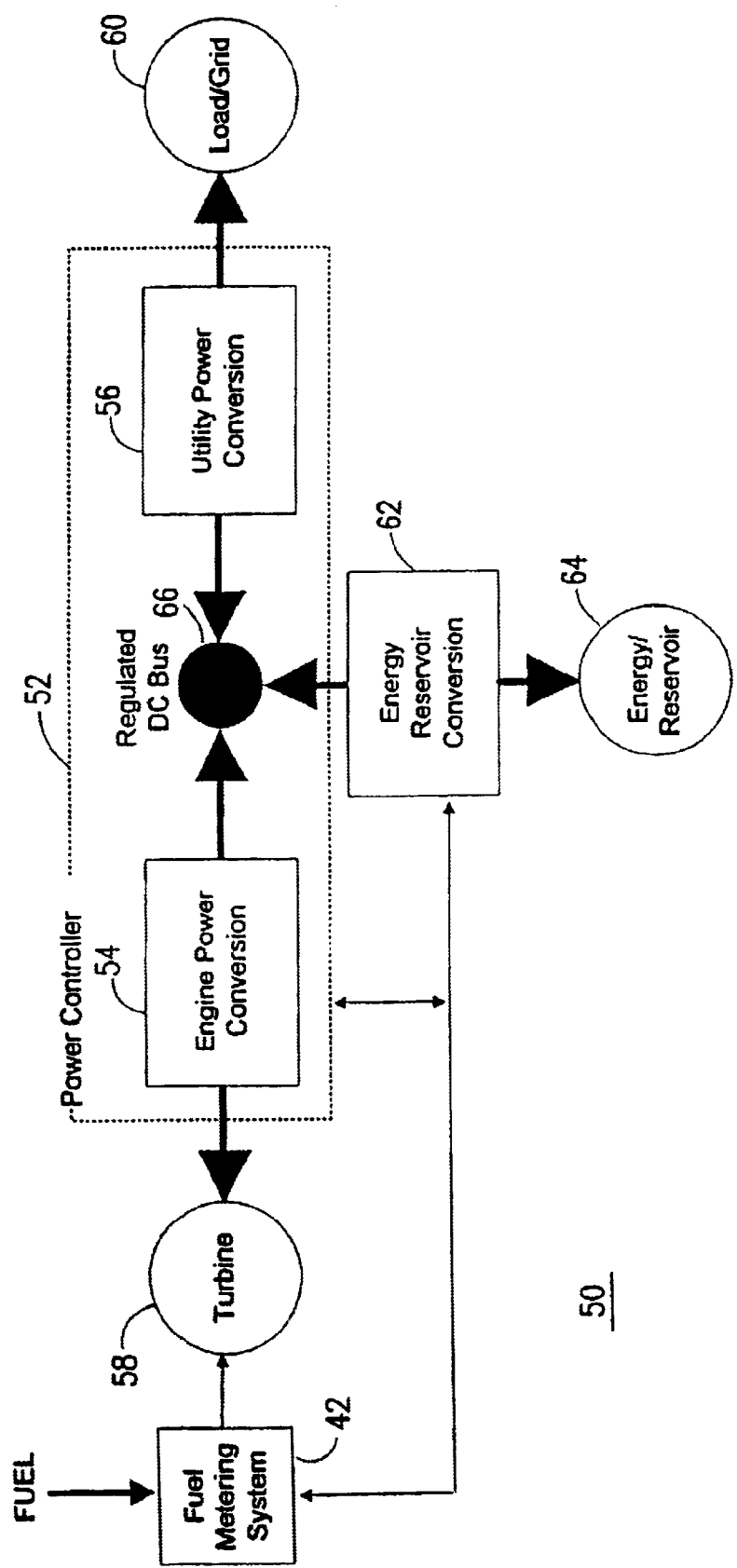
FIG. 3 is a simplified block diagram of a turbine system including the power architecture of the power controller illustrated in FIG. 1.

Referring to FIG. 3, a simplified block diagram of turbogenerator system 50 is illustrated. Turbogenerator system 50 includes a fuel metering system 42, turbogenerator 58, power controller 52, energy reservoir converter 62, energy reservoir 64 and load/utility grid 60. The fuel metering system 42 is matched to the available fuel and pressure. The power controller 52 converts the electricity from turbogenerator 58 into regulated DC then converts it to utility grade AC electricity. By separating the engine power conversion process from the utility power conversion process, greater control of both processes is realized. All of the interconnections are provided by a communications bus and a power connection.

The power controller 52 includes engine power converter 54 and utility/load power converter between turbogenerator 58 and the load/utility grid 60. The bi-directional (i.e. reconfigurable) power converters 54 and 56 are used with a common regulated DC bus 66. Each power converter 54 and 56 operates essentially as a customized bi-directional switching converter configured, under the control of the power controller 52, to provide an interface for a specific energy component 58 or 60 to the DC bus 66. The power controller 52 controls the way in which each energy component, at any moment, will sink or source power, and the manner in which the DC bus 66 is regulated. Both of these power converters 54 and 56 are capable of operating in a forward or reverse direction. This allows starting turbogenerator 58 from either the energy reservoir 64 or the load/utility grid 60. The regulated DC bus 66 allows a standardized interface to energy reservoirs such as batteries, flywheels, and ultra-caps. The architecture of the present invention permits the use of virtually any technology that can convert its energy to/from electricity.

Since the energy may flow in either direction to or from the energy reservoir 64, transients may be handled by supplying energy or absorbing energy therefrom. Not all systems will need the energy reservoir 64. The energy reservoir 64 and its energy reservoir converter 62 may not be contained inside the power controller 52.

Figure 4:
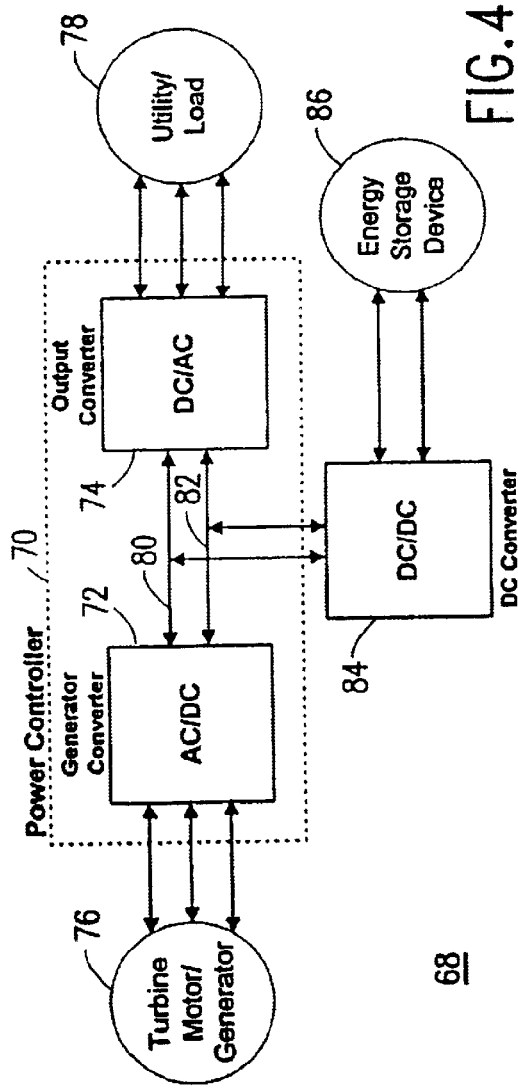
FIG. 4 is a block diagram of the power architecture of a typical implementation of the power controller illustrated in FIG. 1.

Referring to FIG. 4, a typical implementation of a power controller 70 with turbogenerator 76 is shown. The power controller 70 includes motor/generator converter 72 and output converter 74 between turbogenerator 76 and load/utility grid 78. In particular, in the normal power generation mode, motor/generator converter 72 provides for AC to DC power conversion between turbogenerator 70 and DC bus 80 and the output converter 74 provides for DC to AC power conversion between DC bus 80 and load/utility grid 78. Both of these power converters 72 and 74 are capable of operating in a forward or reverse direction. This allows starting the turbine engine of turbogenerator 76 from either the energy storage device 86 or the load/utility grid 78.

Since the energy may flow in either direction to or from the energy storage device 86, transients may be handled by supplying or absorbing energy therefrom. The energy storage device 86 and its DC converter 84 may not be contained inside the power controller 52. The DC converter 84 provides for DC to DC power conversion.

Figure 5:
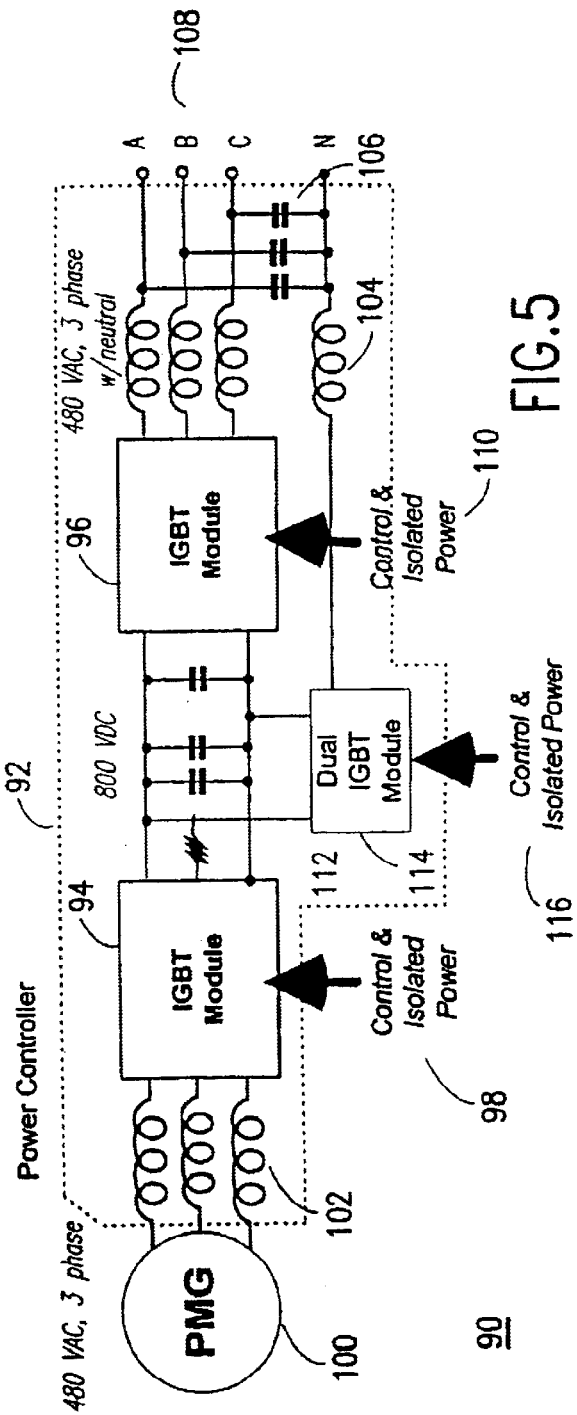
FIG. 5 is a schematic diagram of the internal power architecture of the power controller illustrated in FIG. 1.

Referring now also to FIG. 5, a partial schematic of a typical internal power architecture of a system as shown in FIG. 4, is shown in greater detail. Turbogenerator 58 includes an integral motor/generator 100, such as a permanent magnet motor/generator, that is rotationally coupled to the turbine engine therein and that can be used as either a motor (for starting) or a generator (for normal mode of operation). Because all of the controls can be performed in the digital domain and all switching (except for one output contactor such as output contactor 210 shown below in FIG. 8) is done with solid state switches, it is easy to shift the direction of the power flow as needed. This permits very tight control of the speed of the turbine engine in turbogenerator 58 during starting and stopping.

In a typical configuration, the power output may be a 480 VAC, 3-phase output. One skilled in the art will recognize that the present invention may be adapted to provide for other power output requirements such as a 3-phase, 400 VAC, and single-phase, 480 VAC.

Power controller 92 includes motor/generator converter 94 and output converter 96. Motor/generator converter 94 includes IGBT switches, such as a seven-pack IGBT module, driven by control logic 98, providing a variable voltage, variable frequency 3-phase drive to the motor/generator 100 from the DC bus during startup. Inductors 102 are utilized to minimize any current surges associated with the high frequency switching components which may affect the motor/generator 100 to increase operating efficiency.

Motor/generator converter 94 controls motor/generator 100 and the turbine engine of turbogenerator 76. Motor/generator converter 94 incorporates gate driver and fault sensing circuitry as well as a seventh IGBT used to dump power into a resistor, such as brake resistor 612 shown in FIG. 18 and discussed below. The gate drive inputs and fault outputs require external isolation. Four external, isolated power supplies are required to power the internal gate drivers. Motor/generator converter 94 is typically used in a turbogenerator system that generates 480 VAC at its output terminals delivering power to freestanding or utility-connected load 108. During startup and cool down (and occasionally during normal operation), the direction of power flow through motor/generator converter 94 reverses. When the turbine engine of turbogenerator 76 is being started, power is supplied to the DC bus 80 from either an energy reservoir such as a battery (not shown in this figure) or from load/utility grid 108. The DC on DC bus 80 is then converted to a variable frequency AC voltage to operate motor/generator 100 as a motor to start the turbine engine in turbogenerator 76.

For utility grid connect operation, control logic 110 sequentially drives solid state IGBT switches, typically configured in a six-pack IGBT module, associated with load or output converter 96 to boost the utility voltage to provide start power to the motor/generator converter 94. The IGBT switches in load or output converter 96 are preferably operated at a high (15 kHz) frequency, and modulated in a pulse width modulation manner to provide four quadrant converter operation. Inductors 104 and AC filter capacitors 106 are utilized to minimize any current surges associated with the high frequency switching components which may affect load/utility grid 108.

Output converter 96 incorporates gate driver and fault sensing circuitry. The gate drive inputs and fault outputs require external isolation. Four external, isolated power supplies are required to power the internal gate drivers. After turbogenerator 76 is running, output converter 96 is used to convert the regulated DC bus voltage to the approximately 50 or 60 hertz frequency typically required for utility grade power to supply utility grid/load 108.

When there is no battery (or other energy reservoir), the energy to run turbogenerator 76 during startup and cool down must come from load/utility grid 108. Under this condition, the direction of power flow through the six-pack IGBT module in output converter 96 reverses. DC bus 80 receives its energy from load/utility grid 108, via the six-pack IGBT module in output converter 96 acting as a rectifier. The DC on bus 80 is then converted to a variable frequency AC voltage by motor/generator converter 94 to operate motor/generator 100 as a motor to start turbogenerator 76. To accelerate the turbine engine of turbogenerator 76 as rapidly as possible at first, current flows at the maximum rate through the seven-pack IGBT module in motor/generator converter 72 and also through the six-pack IGBT module in output converter 74. Dual IGBT module 114, driven by control logic 116, may also be used to provide an optional neutral to supply 3 phase, 4 wire loads.

Figure 8:
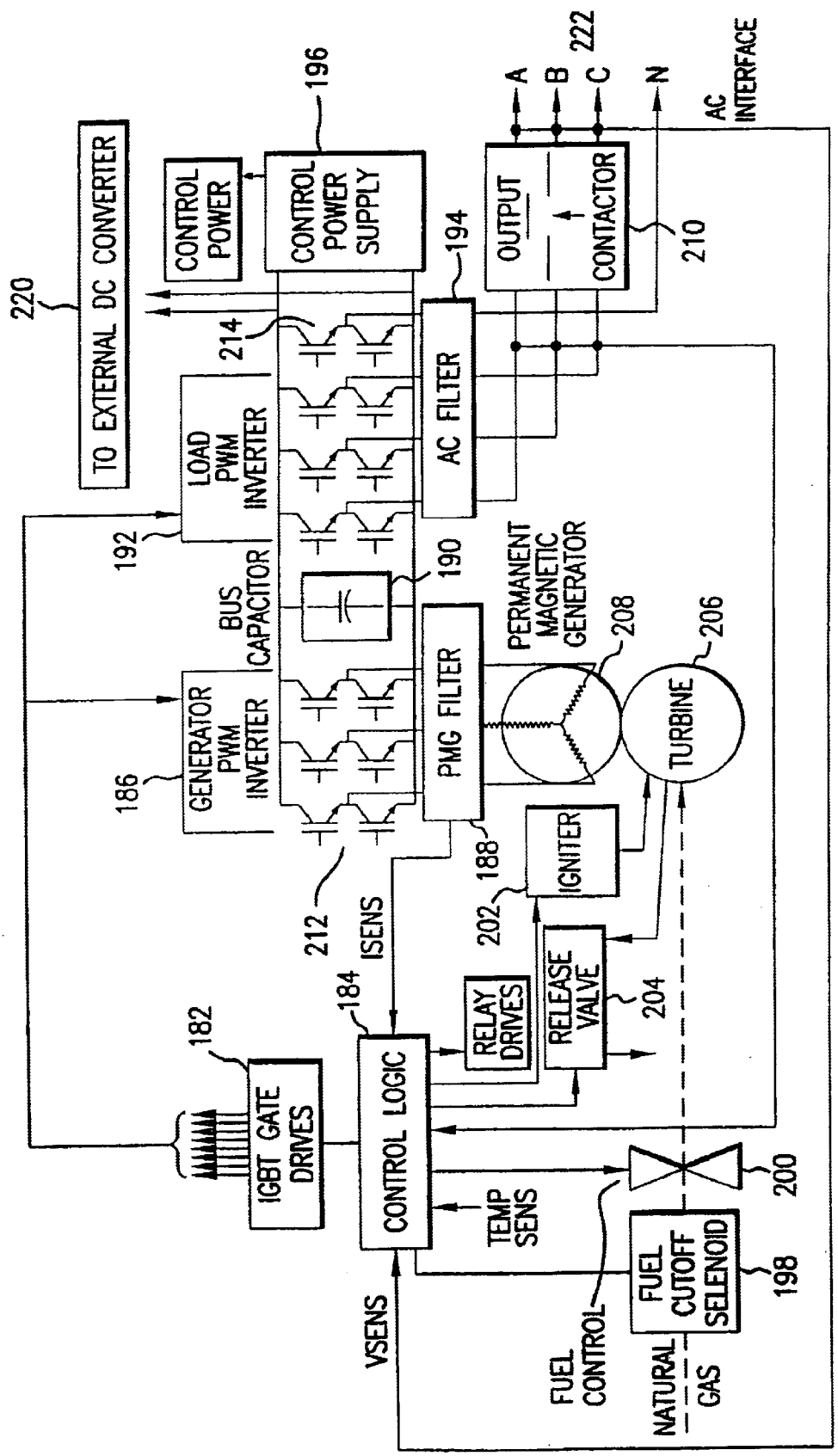
FIG. 8 is a schematic diagram of an interface between a load/utility grid and turbine generator using the power controller according to the present invention.

Referring again to FIG. 3, the energy needed to start turbogenerator 58 may come from load/utility grid 60 or from energy reservoir 64, which may include a device such as a battery, flywheel or ultra-capacitor. When utility grid 60 supplies the energy, utility grid 60 is connected to power controller 52 through two circuits. First is an output contactor, such as output contactor 210 as shown in FIG. 8, that handles the full power. Second is a "soft-start" or "pre-charge" circuit that supplies limited power (it is current limited to prevent very large surge currents) from utility grid 60 to DC bus 66 through a simple rectifier. The amount of power supplied through the soft-start circuit is enough to start the housekeeping power supply, power the control board, and run the power supplies for the IGBTs, and close the output contactor. When the output contactor closes, the IGBTs are configured to create DC from the AC waveform. Enough power is created to run the fuel metering circuit 42, start the engine, and close the various solenoids (including the dump valve on the engine).

When energy reservoir 64 supplies the energy, energy reservoir 64 has its own power conversion circuit, energy reservoir converter 62, that limits the surge circuit into DC bus capacitors 68. Energy reservoir 64 allows enough power to flow to DC bus 66 to run fuel-metering circuit 42, start the turbine engine of turbogenerator 58, and close the various solenoids (including the dump valve on the turbine engine). After the turbine engine becomes self-sustaining, the energy reservoir 64 starts to replace the energy used to start the turbine engine, by drawing power from DC bus 66.

In addition to the sequences described above, power controller 52 senses the presence of other controllers during the initial power up phase. If another controller is detected, the controller must be part of a multi-pack, and proceeds to automatically configure itself for operation as part of a multi-pack.

Referring to FIG. 6, a functional block diagram 130 of an interface between load grid 132 and turbine 148 connected to permanent magnet generator 146 using power controller 136 of the present invention is shown. In this example, power controller 136 includes two bi-directional converters 138 and 140. Permanent magnet generator converter 140 starts turbine 148 (using the generator 146 as a motor) from utility or battery power (battery not shown). Load converter 138 then produces AC power using an output from generator converter 140 to draw power from high-speed turbine generator 148. Power controller 136 also regulates fuel to turbine 148 and provides communications between units (in paralleled systems) and to external entities.

During a utility startup sequence, utility 132 supplies starting power to turbine 148 by "actively" rectifying the line via load converter 138, and then converting the DC to variable voltage, variable frequency 3-phase power in generator converter 136.

As is illustrated in FIG. 7, for stand-alone applications 150, the start sequence is the same as the utility start sequence shown in FIG. 6, with the exception that the start power comes from battery 170 under the control of an external battery controller. Load 152 is then fed from the output terminals of load converter 158.

Referring to FIG. 8, a schematic illustration 180 of an interface between load grid 132 and turbine generator 148 using the power controller is illustrated. Control logic 184 also provides power to fuel cutoff solenoids 198, fuel control valve 200 and igniter 202. An external battery controller (not shown), if used, connects directly to DC bus 190. In accordance with an alternative embodiment of the invention, a fuel system (not shown) involving a compressor (not shown) operated from a separate variable speed drive can also derive its power directly from DC bus 190.

In operation, control and start power comes from either the external battery controller (for battery start applications) or from the utility, which is connected to a rectifier using inrush limiting techniques to slowly charge internal bus capacitor 190. For grid connect operation, control logic 184 sequentially drives solid state IGBT switches 214 associated with load converter 192 to boost the utility voltage to provide start power to generator converter 186. Switches 214 are preferably operated at a high (15 kHz) frequency, and modulated in a pulse width modulation manner to provide four quadrant converter operation. In accordance with the present invention, load converter 192 either sources power from DC bus 190 to grid 222 or from grid 222 to DC bus 190. A current regulator (not shown) may achieve this control. Optionally, two of the switches 214 serve to create an artificial neutral for stand-alone applications (for stand-alone applications, start power from an external DC supply (not shown) associated with external DC converter 220 is applied directly to DC bus 190).

Solid state (IGBT) switches 214 associated with generator converter 186 are also driven from control logic 184, providing a variable voltage, variable frequency 3-phase drive to motor 218 to start turbine 208. Control logic 184 receives feedback via current sensors $I_{sens}$ as turbine 206 is ramped up in speed to complete the start sequence. When turbine 206 achieves a self sustaining speed of, for example, approx. 40,000 RPM, generator converter 186 changes its mode of operation to boost the generator output voltage and provide a regulated DC bus voltage.

PMG filter 188 associated with generator converter 186 includes three inductors to remove the high frequency switching component from permanent magnet generator 208 to increase operating efficiency. Output AC filter 194 associated with load converter 192 includes three or optionally four inductors (not shown) and AC filter capacitors (not shown) to remove the high frequency switching component. Output contactor 210 disengages load converter 192 in the event of a unit fault.

During a start sequence, control logic 184 opens fuel cutoff solenoid 198 and maintains it open until the system is commanded off. Fuel control 200 may be a variable flow valve providing a dynamic regulating range, allowing minimum fuel during start and maximum fuel at full load. A variety of fuel controllers, including but not limited to, liquid and gas fuel controllers, may be utilized. One skilled in the art will recognize that the fuel control can be by various configurations, including but not limited to a single or dual stage gas compressor accepting fuel pressures as low as approximately ¼ psig. Igniter 202, a spark type device similar to a spark plug for an internal combustion engine, is operated only during the start sequence.

For stand-alone operation, turbine 206 is started using external DC converter 220 which boosts voltage from a battery (not shown), and connects directly to the DC bus 190. Load converter 192 is then configured as a constant voltage, constant frequency (for example, approximately 50 or 60 Hz) source. One skilled in the art will recognize that the output is not limited to a constant voltage, constant frequency source, but rather may be a variable voltage, variable frequency source. For rapid increases in output demand, external DC converter 220 supplies energy temporarily to DC bus 190 and to the output. The energy is restored after a new operating point is achieved.

For grid connect operation, the grid power is used for starting as described above. When turbine 206 has reached a desired operating speed, converter 192 is operated at grid frequency, synchronized with grid 222, and essentially operates as a current source converter, requiring grid voltage for excitation. If grid 222 collapses, the loss of grid 222 is sensed, the unit output goes to zero (0) and disconnects. The unit can receive external control signals to control the desired output power, such as to offset the power drawn by a facility, but ensure that the load is not backfed from the system.

Figure 9:
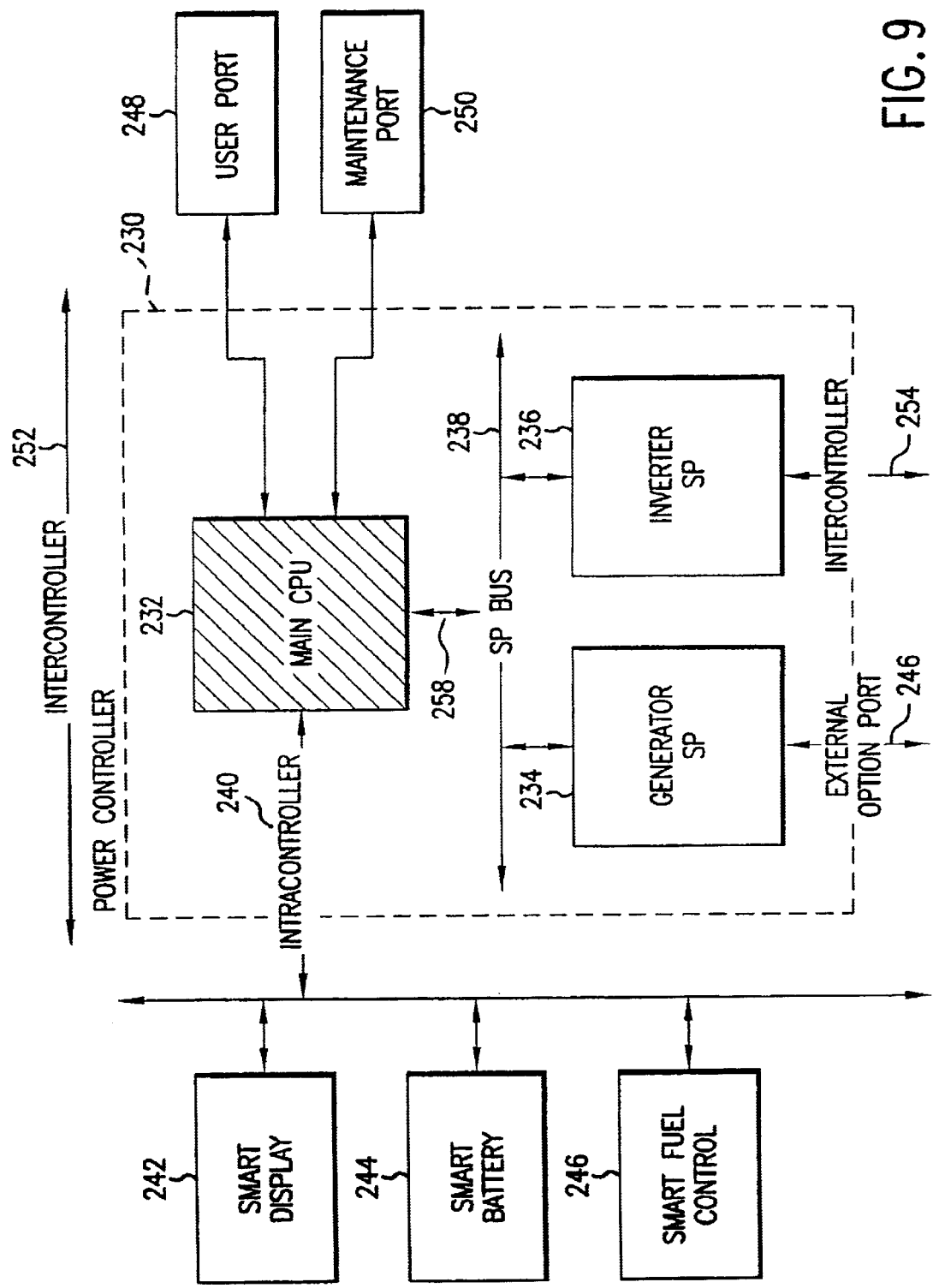
FIG. 9 is a block diagram of the software architecture for the power controller including external interfaces.

Referring to FIG. 9, power controller logic 230 of power controller 52 (as shown in FIG. 3) includes main CPU 232, motor/generator converter SP 234 and output converter SP 236. Main CPU software program sequences events which occur inside power controller logic 230 and arbitrates communications to externally connected devices. Main CPU 232 is preferably a MC68332 microprocessor, available from Motorola Semiconductor, Inc. of Phoenix, Ariz. Other suitable commercially available microprocessors may be used as well. The software performs the algorithms that control engine operation, determine power output and detect system faults.

Commanded operating modes are used to determine how power is switched through the major converters in power controller 52 (shown in FIG. 3). The software is responsible for turbine engine control and issuing commands to other SP processors enabling them to perform the motor/generator converter and output/load converter power switching. The controls also interface with externally connected energy storage devices (not shown) that provide cold start and transient capabilities.

Motor/generator converter SP 234 and output converter SP 236 are connected to main CPU 232 via serial peripheral interface (SPI) bus 238 to perform motor/generator converter and output converter control functions. Motor/generator converter SP 234 is responsible for any switching which occurs between DC bus 66 and motor/generator 100. Output converter SP 236 is responsible for any switching which occurs between DC bus 66 and load/utility grid 60.

With additional reference to FIG. 5, motor/generator converter SP 234 operates the IGBT module in motor/generator converter 94 via control logic 98 while output converter SP 236 operates the IGBT module in output converter 96 via control logic 110.

Local devices, such as smart display 242, smart battery 244 and smart fuel control 246, are connected to main CPU 232 via intracontroller bus 240, which may be a RS485 communications link. Smart display 242, smart battery 244 and smart fuel control 246 perform dedicated controller functions, including but not limited to display, energy storage management, and fuel control functions.

Main CPU 232 in power controller logic 230 is coupled to user port 248 for connection to a computer, workstation, modem or other data terminal equipment which allows for data acquisition and/or remote control. User port 248 may be implemented using a RS232 interface or other compatible interface.

Main CPU 232 in power controller logic 230 is also coupled to maintenance port 250 for connection to a computer, workstation, modem or other data terminal equipment which allows for remote development, troubleshooting and field upgrades. Maintenance port 250 may be implemented using a RS232 interface or other compatible interface.

Figure 15:
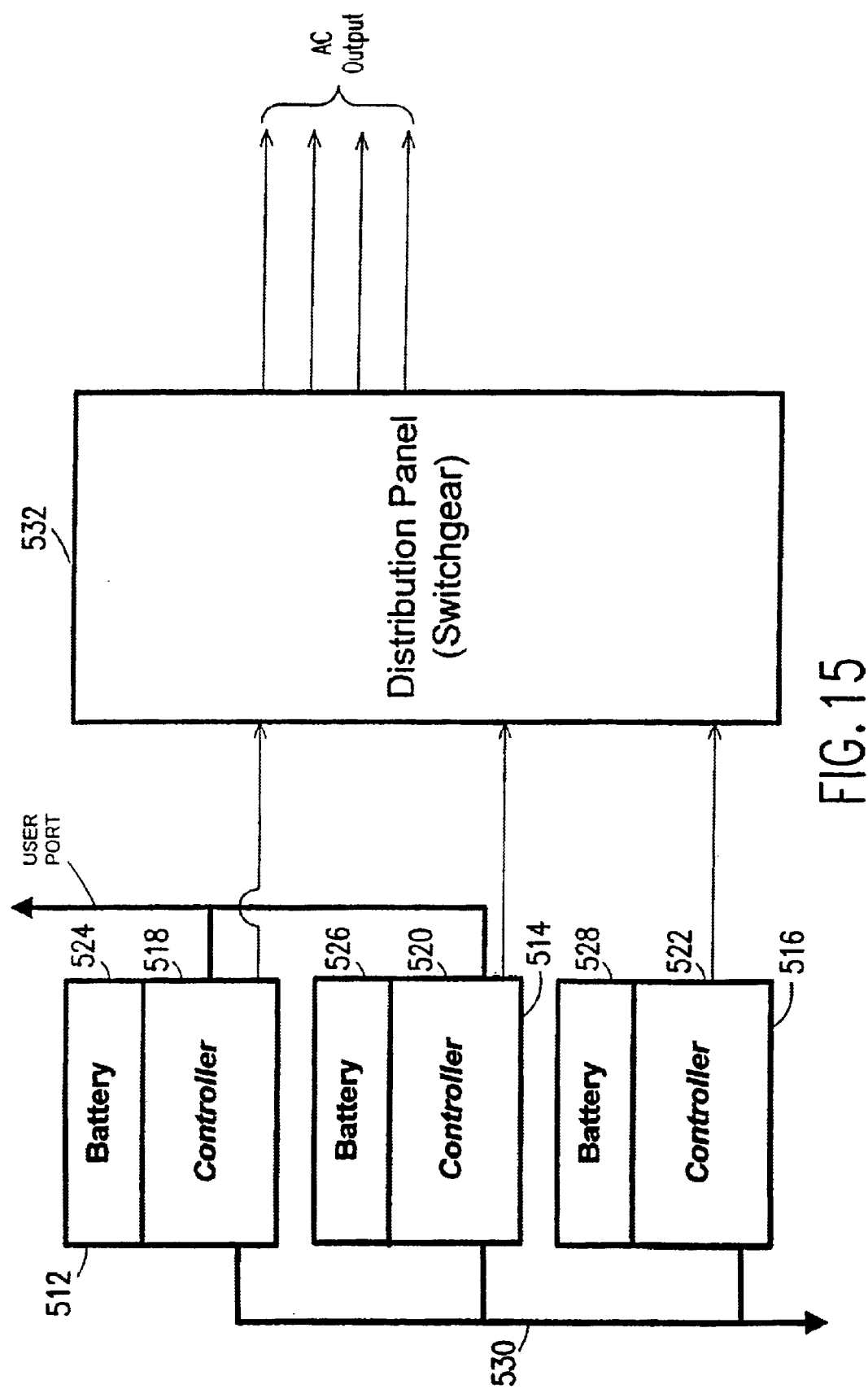
FIG. 15 is a block diagram of the power controller in multi-pack configuration.

The main CPU processor software communicates data through a TCP/IP stack over intercontroller bus 252, typically an Ethernet 10 Base 2 interface, to gather data and send commands between power controllers (as shown and discussed in detail with respect to FIG. 15). In accordance with the present invention, the main CPU processor software provides seamless operation of multiple paralleled units as a single larger generator system. One unit, the master, arbitrates the bus and sends commands to all units.

Intercontroller bus 254, which may be a RS485 communications link, provides high-speed synchronization of power output signals directly between load converter SPs, such as load converter SP 236. Although the main CPU software is not responsible for communicating on the intercontroller bus 254, it informs load converter SPs, including load converter SP 236, when main CPU 232 is selected as the master.

External option port bus 256, which may be a RS485 communications link, allows external devices, including but not limited to power meter equipment and auto disconnect switches, to be connected to motor/generator converter SP 234.

In operation, main CPU 232 begins execution with a power on self-test when power is applied to the control board. External devices are detected providing information to determine operating modes the system is configured to handle. Power controller logic 230 waits for a start command by making queries to external devices. Once received, power controller logic 230 sequences up to begin producing power. As a minimum, main CPU 232 sends commands to external smart devices 242, 244 and 246 to assist with bringing power controller logic 230 online.

If selected as the master, the software may also send commands to initiate the sequencing of other power controllers (FIG. 15) connected in parallel. A stop command will shutdown the system bringing it offline.

The main CPU 232 software interfaces with several electronic circuits (not shown) on the control board to operate devices that are universal to all power controller logic 230. Interface to system I/O begins with initialization of registers within power controller logic 230 to configure internal modes and select external pin control. Once initialized, the software has access to various circuits including discrete inputs/outputs, analog inputs/outputs, and communication ports. These external devices may also have registers within them that require initialization before the device is operational.

Each of the following sub-sections provides a brief overview that defines the peripheral device the software must interface with. The contents of these sub-sections do not define the precise hardware register initialization required.

Still referring to FIG. 9, main CPU 232 is responsible for all communication systems in power controller logic 230. Data transmission between a plurality of power controllers 52 (shown in FIG. 3) is accomplished through intercontroller bus 252. Main CPU 232 initializes the communications hardware attached to power controller logic 230 for intercontroller bus 252.

Main CPU 232 provides control for external devices, including smart devices 242, 244 and 246, which share information to operate. Data transmission to external devices, including smart display 242, smart battery 244 and smart fuel control 246 devices, is accomplished through intracontroller communications bus 240. Main CPU 232 initializes any communications hardware attached to power controller logic 230 for intracontroller communications bus 240 and implements features defined for the bus master on intracontroller communications bus 240.

Communications between devices such as switch gear and power meters used for master control functions exchange data across external equipment bus 256. Main CPU 232 initializes any communications hardware attached to power controller logic 230 for external equipment bus 256 and implements features defined for the bus master on external equipment bus 246.

Communications with a user computer is accomplished through user interface port 248. Main CPU 232 initializes any communications hardware attached to power controller logic 230 for user interface port 248. In a typical configuration, at power up, the initial baud rate will be selected to 19200 baud, 8 data bits, 1 stop, and no parity. The user has the ability to adjust and save the communications rate setting via user interface port 248 or optional smart external display 242. The saved communications rate is used the next time power controller logic 230 is powered on. Main CPU 232 communicates with a modem (not shown), such as a Hayes compatible modem, through user interface port 248. Once communications are established, main CPU 232 operates as if were connected to a local computer and operates as a slave on user interface port 248 (it only responds to commands issued).

Communications to service engineers, maintenance centers, and so forth are accomplished through maintenance interface port 250. Main CPU 232 initializes the communications to any hardware attached to power controller logic 230 for maintenance interface port 250. In a typical implementation, at power up, the initial baud rate will be selected to 19200 baud, 8 data bits, 1 stop, and no parity. The user has the ability to adjust and save the communications rate setting via user port 248 or optional smart external display 242. The saved communications rate is used the next time power controller logic 230 is powered on. Main CPU 232 communicates with a modem, such as a Hayes compatible modem, through maintenance interface port 250. Once communications are established, main CPU 232 operates as if it were connected to a local computer and operates as a slave on maintenance interface port 250 (it only responds to commands issued).

With continued reference to FIG. 9, main CPU 232 orchestrates operation for motor/generator converter, load converter, and turbine engine controls for power controller logic 230. The main CPU 232 does not directly perform motor/generator and output converter controls. Rather, motor/generator and output converter SP processors 234 and 236 perform the specific control algorithms based on data communicated from main CPU 232. Engine controls are performed directly by main CPU 232 (see FIG. 14).

Main CPU 232 issues commands via SPI communications bus 238 to motor/generator converter SP 234 to execute the required motor/generator control functions. Motor/generator converter SP 234 will operate motor/generator 146, shown in FIG. 6, in either a DC bus mode or a RPM mode as selected by main CPU 232. In the DC bus voltage mode, motor/generator converter SP 234 uses power from the motor/generator 146 to maintain the DC bus voltage at the setpoint. In the RPM mode, motor/generator converter SP 234 uses power from the motor/generator 146 to maintain the engine speed of turbine engine 148 at the setpoint. Main CPU 232 provides Setpoint values.

Main CPU 232 issues commands via SPI communications bus 238 to output converter SP 236 to execute required converter control functions. Output converter SP 236 will operate the output converter 74 shown in FIG. 5, in a DC bus mode, output current mode, or output voltage mode as selected by main CPU 232. In the DC bus voltage mode, output converter SP 236 regulates the utility power provided by output converter 74 to maintain the voltage of DC bus 66 at the setpoint.

In the output current mode, output converter SP 236 uses power from the DC bus 66 to provide commanded current out of the output converter 74 for load/utility grid 60. In the output voltage mode, output converter SP 236 uses power from the DC bus 66 to provide commanded voltage out of the output converter 74 for load/utility grid 60. Main CPU 232 provides Setpoint values.

Figure 10:
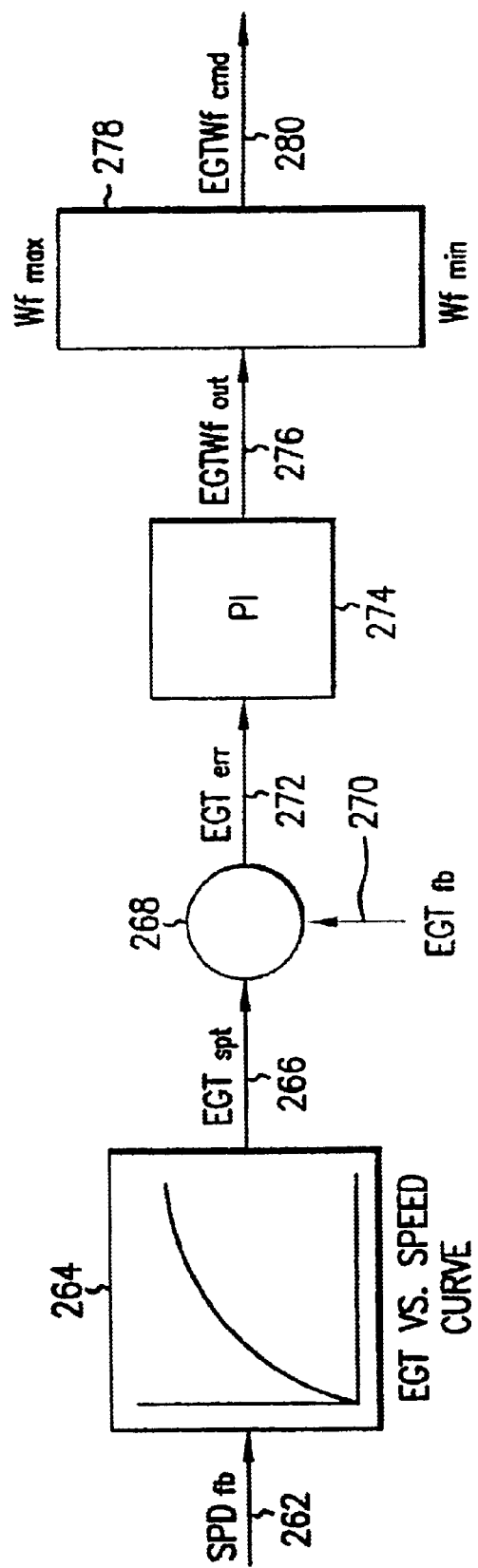
FIG. 10 is a block diagram of an EGT control mode loop for regulating the temperature of the turbine.
Figure 11:
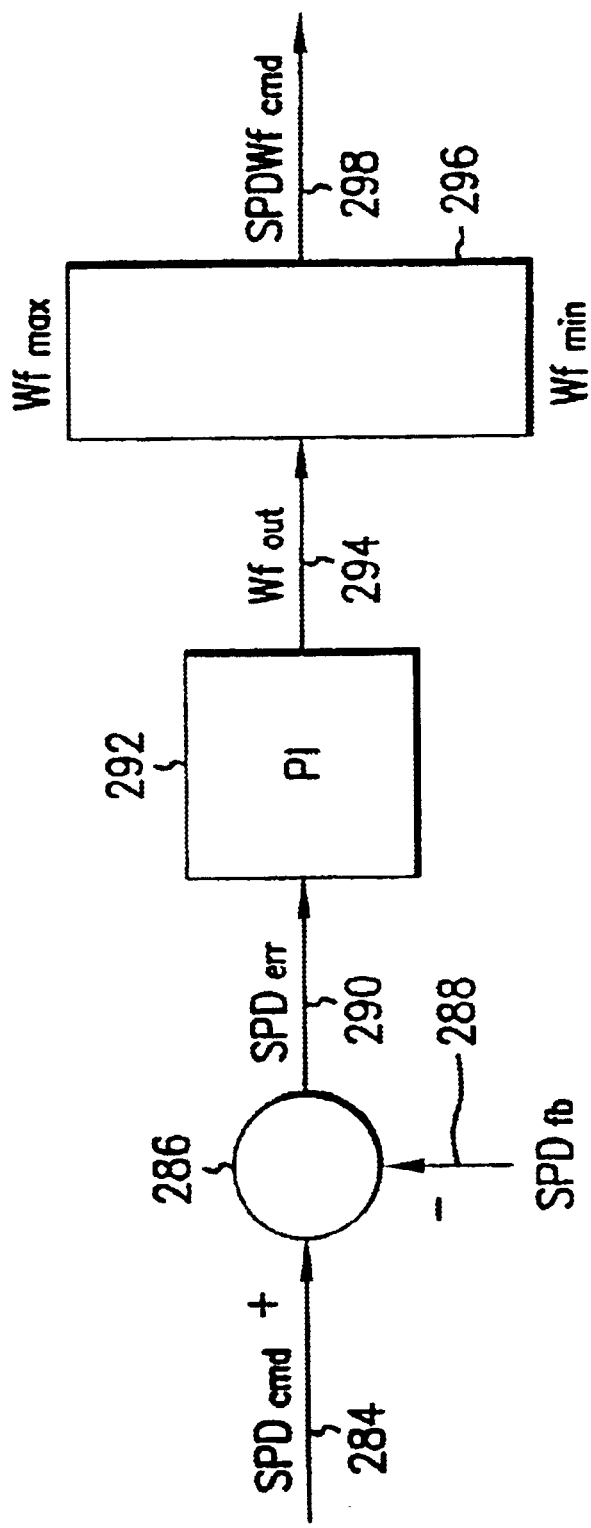
FIG. 11 is a block diagram of a speed control mode loop for regulating the rotating speed of the turbine.
Figure 12:
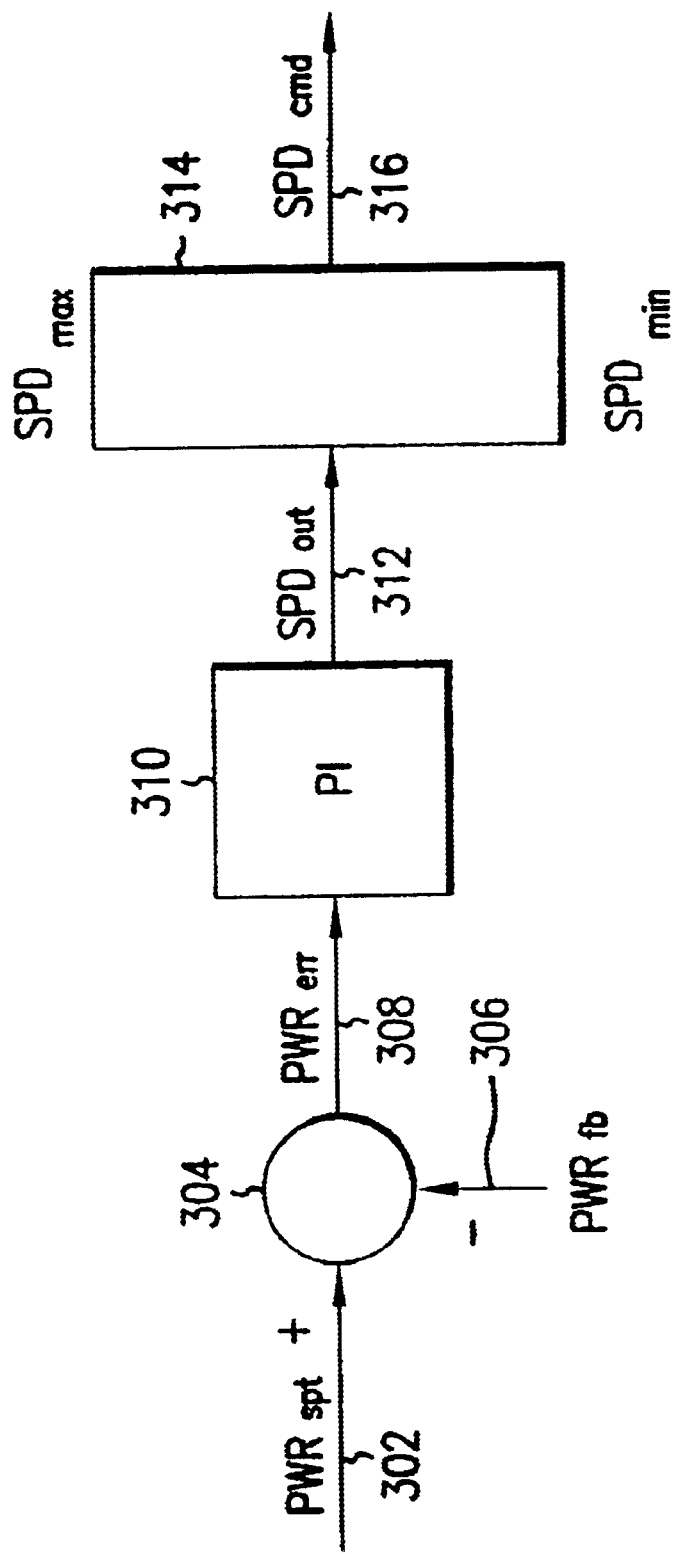
FIG. 12 is a block diagram of a power control mode loop for regulating the power producing potential of the turbine.

Referring to FIGS. 10–12, control loops 260, 282 and 300 may be used to regulate engine controls of turbine engine 148. These loops include exhaust gas temperature (EGT) control (FIG. 10), speed control (FIG. 11) and power control (FIG. 12). All three of the control loops 260, 282 and 300 may be used individually and collectively by main CPU 232 to provide the dynamic control and performance required by power controller logic 230. These loops may be joined together for different modes of operation.

The open-loop light off control algorithm is a programmed command of the fuel device, such as fuel control system 42, used to inject fuel until combustion begins. In a typical configuration, main CPU 232 takes a snap shot of the engine EGT and begins commanding the fuel device from about 0% to 25% of full command over about 5 seconds. Engine light is declared when the engine EGT rises about 28° C. (50° F.) from the initial snap shot.

Referring to FIG. 10, EGT control loop 260 provides various fuel output commands to regulate the temperature of the turbine engine 148. Engine speed signal 262 is used to determine the maximum EGT setpoint temperature 266 in accordance with predetermined setpoint temperature values illustrated in EGT vs. Speed Curve 264. EGT setpoint temperature 266 is compared by comparator 268 against feedback EGT signal 270 to determine EGT error signal 272, which is then applied to a proportional-integral (PI) algorithm 274 for determining the fuel command 276 required to regulate EGT at the setpoint. Maximum/minimum fuel limits 278 are used to limit EGT control algorithm fuel command output 276 to protect from integrator windup. Resultant EGT fuel output signal 280 is the regulated EGT signal fuel flow command. In operation, EGT control mode loop 260 operates at about a 100 ms rate.

Referring to FIG. 11, speed control mode loop 282 provides various fuel output commands to regulate the rotating speed of the turbine engine 148. Feedback speed signal 288 is read and compared by comparator 286 against setpoint speed signal 284 to determine error signal 290, which is then applied to PI algorithm 292 to determine the fuel command required to regulate turbine engine speed at the setpoint. EGT control (FIG. 10) and maximum/minimum fuel limits are used in conjunction with the speed control loop or algorithm 282 to protect output signal 294 from surge and flame out conditions. Resultant output signal 298 is regulated turbine speed fuel flow command. In a typical implementation, speed control mode loop 282 operates at about a 20 ms rate.

Referring to FIG. 12, power control loop 300 regulates the power producing potential of the turbine engine 148. Feedback power signal 306 is read and compared by comparator 304 against setpoint power signal 302 to determine power error signal 308, which is then applied to PI algorithm 310 to determine the speed command required to regulate output power at the setpoint. Maximum/minimum speed limits are used to limit the power control algorithm speed command output to protect output signal 312 from running into over speed and under speed conditions. Resultant output signal 316 is regulated power signal turbine speed command. In a typical implementation, the maximum operating speed of the turbine engine is generally 96,000 RPM and the minimum operating speed of the turbine is generally 45,000 RPM. The loop operates generally at about a 500 ms rate.

Figure 14:
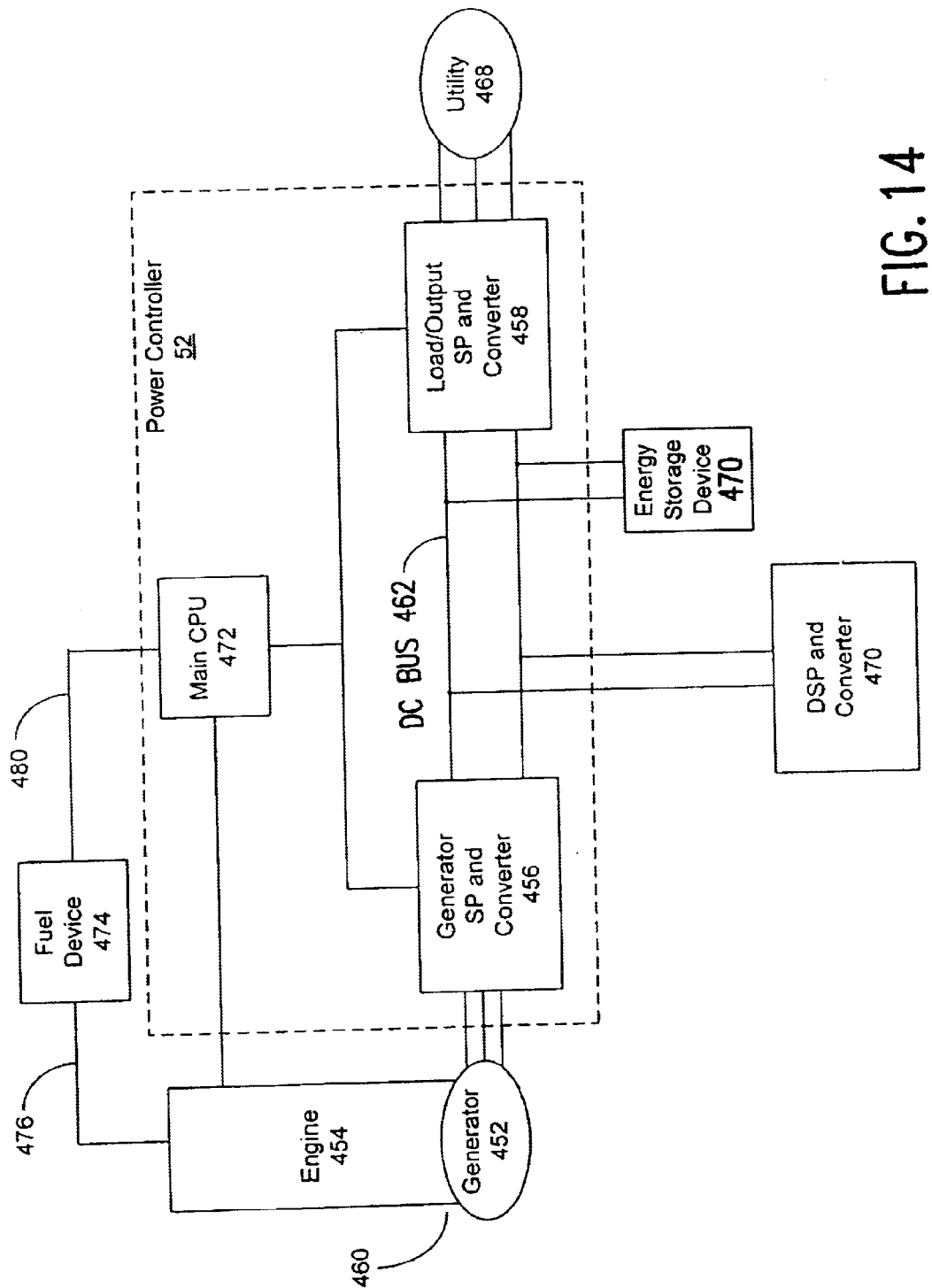
FIG. 14 is a block diagram of the power controller interfacing with a turbine and fuel device.

Referring to FIG. 14, the energy storage device in energy storage SP and converter 470 may be a start only battery. In the DC bus voltage control mode, energy storage device 471 provides energy to regulate voltage on DC bus 66 to the bus voltage setpoint command. Main CPU 232 commands the bus voltage on DC bus 66 to control at different voltage setpoint values depending on the configuration of power controller 52. In the state of charge (SOC) control mode, the start only battery system provides a recharging power demand when requested. Available recharging power is generally equivalent to maximum engine power less power being supplied to the output load and system parasitic loads. Main CPU 232 transmits a recharging power level that is the minimum of the original power demand and available recharging power.

The transient battery provides the DC bus voltage control as described below as well as the state of charge (SOC) control mode described for the start only battery. The transient battery contains a larger energy storage device than the start only battery.

In the DC Bus Voltage Control mode, DC bus 66 supplies power for logic power, external components and system power output. TABLE 1 defines the setpoint the bus voltage is to be controlled at based on the output power configuration of power controller 52:

TABLE 1

| B3 POWER OUTPUT | SETPOINT |
|---|---|
| 480/400 VAC Output | 800 Vdc |
| 240/208 VAC Output | 400 Vdc |

Figure 13:
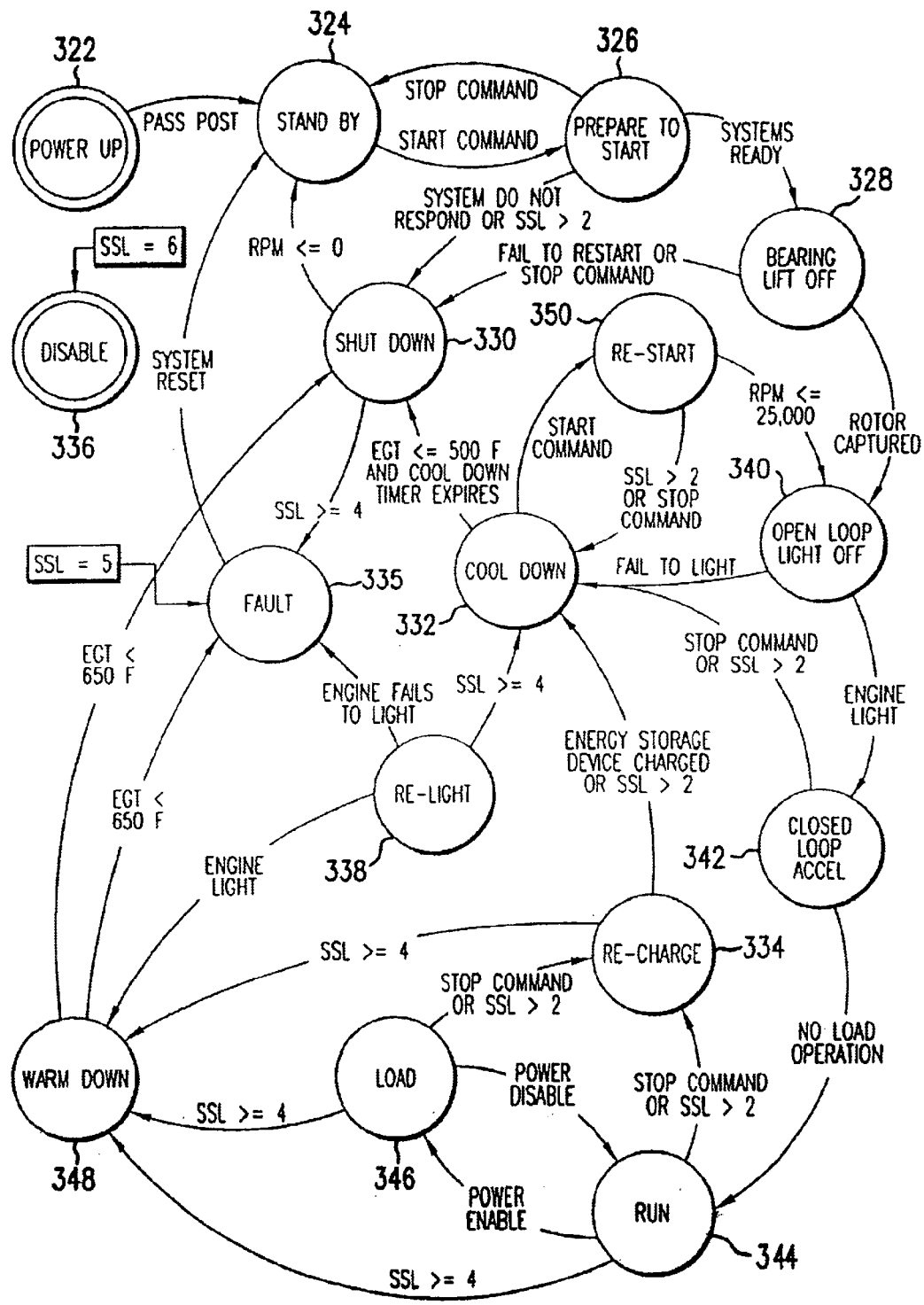
FIG. 13 is a state diagram showing various operating states of the power controller.

In the various operating modes, power controller 52 will have different control algorithms responsible for managing the DC bus voltage level. Any of the battery options in energy storage SP and converter 470 as well as SPs 456 and 458 have modes that control power flow to regulate the voltage level of DC bus 66. Under any operating circumstances, only one device is commanded to a mode that regulates DC bus 66. Multiple algorithms would require sharing logic that would inevitably make system response slower and software more difficult to comprehend. Referring now also to FIG. 13, state diagram 320 showing various operating states of power controller 52 is illustrated. Sequencing the system through the entire operating procedure requires power controller 52 to transition through the operating states defined in TABLE 2.

TABLE 2

| STATE NO. | SYSTEM STATE | DESCRIPTION |
|---|---|---|
| 322 | Power Up | Performs activities of initializing and testing the system. Upon passing Power On Self Test (POST), move to Standby state 324. |
| 324 | Stand By | Close power to bus and continues system monitoring while waiting for a start command. Upon receipt of Start Command, move to Prepare to Start state 326. |
| 326 | Prepare to Start | Initializes any external devices preparing for the start procedure. Returns to Stand By state 324 if Stop Command received. Moves to Shut Down state 330 if systems do not respond or if a fault is detected with a system severity level (SSL) greater than 2. Upon systems ready, move to Bearing Lift Off state 328. |
| 328 | Bearing Lift Off | Configures the system and commands the turbine engine 148 to be rotated to a predetermined RPM, such as 25,000 RPM. Moves to Shut Down state 330 upon failure of turbine engine 148 to rotate, or receipt of a Stop Command. Upon capture of rotor in motor/generator 100, moves to Open Loop Light Off state 340. |
| 340 | Open Loop Light Off | Turns on ignition system and commands fuel open loop to light turbine engine 148. Moves to Cool Down state 332 upon failure to light. Upon turbine engine 148 light off, moves to Closed Loop Acceleration state 324. |

TABLE 2-continued

| STATE NO. | SYSTEM STATE | DESCRIPTION |
|---|---|---|
| 342 | Closed Loop Acceleration | Continues motoring the turbine engine 148 using closed loop fuel control until the turbogenerator system 50 reaches a predetermined RPM, designated as the No Load state. Moves to Cool Down state 332 upon receipt of Stop Command or if a fault occurs with a SSL greater than 2. Upon reaching No Load state, moves to Run state 344. |
| 344 | Run | Turbine engine 148 operates in a no load, self-sustaining state producing power to operate the power controller 52. Moves to Warm Down state 348 if SSL is greater than or equal to 4. Moves to Re-Charge state 334 if Stop Command is received or if a fault occurs with a SSL less than 2. Upon receipt of Power Enable command, moves to Load state 346. |
| 346 | Load | Converter output contactor 210 is closed and turbogenerator system 50 is producing power applied to load 60. Moves to Warm Down state 348 if a fault occurs with a SSL greater or equal to 4. Moves to Run state 344 if Power Disable command is received. Moves to Re-Charge state 334 if Stop Command is received or if a fault occurs with a SSL greater than 2. |
| 334 | Re-Charge | System operates off fuel only with no power from the grid and produces power for recharging energy storage device if installed, such as battery 170 shown in FIG. 8. Moves to Cool Down state 322 when energy storage device is fully charged or if a fault occurs with a SSL greater than 2. Moves to Warm Down state if a fault occurs with a SSL greater than or equal to 4. |
| 332 | Cool Down | Motor/Generator 100 is motoring turbine engine 148 to reduce EGT before moving to Shut Down state 330. Moves to Re-Start state 350 if Start Command received. Upon expiration of Cool Down Timer, moves to Shut Down state 330 when EGT is less than or equal to 500° F. |
| 350 | Re-Start | Reduces rotational speed of turbogenerator 58 to begin open loop light off when a Start Command is received in the Cool Down state 332. Moves to Cool Down state 332 if Stop Command is received or if a fault occurs with a SSL greater than 2. Upon reaching RPM less than or equal to 25,000 RPM, moves to Open Loop Light Off state 340. |
| 338 | Re-Light | Performs a re-light of turbine engine 148 during transition from the Warm Down state 348 to Cool Down state 332. Allows continued engine cooling when motoring is no longer possible. Moves to Cool Down state 332 if a fault occurs with a SSL greater than or equal to 4. Moves to Fault state 335 if turbine engine 148 fails to light. Upon light off of turbine engine 148, moves to Closed Loop Acceleration state 342. |

TABLE 2-continued

| STATE NO. | SYSTEM STATE | DESCRIPTION |
|---|---|---|
| 348 | Warm Down | Sustains operation of turbine engine 148 with fuel at a predetermined RPM, such as 50,000 RPM, to cool turbine engine 148 when motoring of turbine engine 148 by motor/generator 100 is not possible. Moves to Fault state 335 if EGT is not less than 650° F. within a predetermined time. Upon achieving an EGT less than 650° F., moves to Shut Down state 330. |
| 330 | Shutdown | Reconfigures turbogenerator system 50 after a cooldown in Cool Down state 332 or Warm Down state 348 to enter the Stand By state 324. Moves to Fault state 335 if a fault occurs with a SSL greater than or equal to 4. Moves to Stand By state 324 when RPM is less than or equal to zero. |
| 335 | Fault | Turns off all outputs when a fault occurs with a SSL equal to 5 indicating the presence of a fault which disables power conversion. Logic power is still available for interrogating system faults. Moves to Stand By state 324 upon receipt of System Reset. |
| 336 | Disable | Fault has occurred where processing may no longer be possible. All system operation is disabled when a fault occurs with a SSL equal to 6. |

Main CPU 232 begins execution in Power Up state 322 after power is applied. Transition to Stand By state 324 is performed upon successfully completing the tasks of Power Up state 322. Initiating a start cycle transitions the system to Prepare to Start state 326 where all system components are initialized for an engine start of turbine engine 148. The turbine engine 148 then sequences through start states including Bearing Lift Off state 328, Open Loop Light Off state 340 and Closed Loop Acceleration state 342 and moves on to the "run/load" states, Run state 344 and Load state 346

To shutdown the system, a stop command which sends the system into either Warm Down state 348 or Cool Down state 332 is initiated. Systems that have a battery may enter Re-Charge state 334 prior to entering Warm Down state 348 or Cool Down state 332. When the system has finally completed the "warm down" or "cool down" process in Warm Down state 348 or Cool Down state 332, a transition through Shut Down state 330 will be made before the system re-enters Stand By state 324 awaiting the next start cycle. During any state, detection of a fault with a system severity level (SSL) equal to 5, indicating that the system should not be operated, will transition the system state to Fault state 334. Detection of faults with an SSL equal to 6 indicate a processor failure has occurred and will transition the system to Disable state 336.

In order to accommodate each mode of operation, the state diagram is multidimensional to provide a unique state for each operating mode. For example, in Prepare to Start state 326, control requirements will vary depending on the selected operating mode. Therefore, the presence of separate stand-alone Prepare to Start state 326, stand-alone transient Prepare to Start state 326, utility grid connect Prepare to Start state 326 and utility grid connect transient Prepare to Start state 326 may be required.

Each combination is known as a system configuration (SYSCON) sequence. Main CPU 232 identifies each of the different system configuration sequences in a 16-bit word known as a SYSCON word, which is a bit-wise construction of an operating mode and system state number. In a typical configuration, the system state number is packed in bits 0 through 11. The operating mode number is packed in bits 12 through 15. This packing method provides the system with the capability of sequence through 4096 different system states in 16 different operating modes.

Separate Power Up states 322, Re-Light states 338, Warm Down states 348, Fault states 335 and Disable states 336 may not be required for each mode of operation. The contents of these states are mode independent.

"Power Up" State 322

Operation of the system begins in Power Up state 322 once application of power activates main CPU 232. Once power is applied to power controller 52, all the hardware components will be automatically reset by hardware circuitry. Main CPU 232 is responsible for ensuring the hardware is functioning correctly and configure the components for operation. Main CPU 232 also initializes its own internal data structures and begins execution by starting the Real-Time Operating System (RTOS). Successful completion of these tasks directs transition of the software to Stand By state 324. Main CPU 232 performs these procedures in the following order:

1. Initialize main CPU 232
2. Perform RAM Test
3. Perform FLASH Checksum
4. Start RTOS
5. Run Remaining POST
6. Initialize SPI Communications
7. Verify Motor/Generator Converter SP Checksum
8. Verify Output Converter SP Checksum
9. Initialize IntraController Communications
10. Resolve External Device Addresses
11. Look at Input Line Voltage
12. Determine Mode
13. Initialize Maintenance Port
14. Initialize User Port
15. Initialize External Option Port
16. Initialize InterController
17. Chose Master/Co-Master
18. Resolve Addressing
19. Transition to Stand By State (depends on operating mode)

"Stand By" State 324

Main CPU 232 continues to perform normal system monitoring in Stand By state 324 while it waits for a start command signal. Main CPU 232 commands either energy storage SP and converter 470 or load/utility grid 60 to provide continuous power supply. In operation, main CPU 232 will often be left powered on waiting to be start or for troubleshooting purposes. While main CPU 232 is powered up, the software continues to monitor the system and perform diagnostics in case any failures should occur. All communications will continue to operate providing interface to external sources. A start command will transition the system to the "prepare to start" state 326.

"Prepare to Start" State 326

Main CPU 232 prepares the control system components for the engine start process. Many external devices may require additional time for hardware initialization before the actual start procedure can commence. The "prepare to start"

state 326 provides those devices the necessary time to perform initialization and send acknowledgment to the main CPU 232 that the start process can begin. Once also systems are ready to go, the software will transition to the "bearing lift off" state 328.

"Bearing Lift Off" State 328

Main CPU 232 commands motor/generator SP and converter 456 to motor the turbine engine 148 from typically about 0 to 25,000 RPM to accomplish the bearing lift off procedure. A check is performed to ensure the shaft is rotating before transition to the next state occurs.

"Open Loop Light Off" State 340

Once the motor/generator 100 reaches its liftoff speed, the software commences and ensures combustion is occurring in the turbine engine 148. In a typical configuration, main CPU 232 commands motor/generator SP and converter 456 to motor the turbine engine 148 to a dwell speed of about 25,000 RPM. Execution of the open loop light off state 340 starts combustion. Main CPU 232 then verifies that turbine engine 148 has not met the "fail to light" criteria before transition to the "closed loop accel" state 342.

"Closed Loop Accel" State 342

Main CPU 232 sequences turbine engine 148 through a combustion heating process to bring the turbine engine 148 to a self-sustaining operating point. In a typical configuration, commands are provided to motor/generator SP and converter 456 commanding an increase in engine speed to about 45,000 RPM at a rate of about 4000 RPM/sec. Fuel controls are executed to provide combustion and engine heating. When turbine engine 148 reaches "no load" (requires no electrical power to motor), the software transitions to "run" state 344.

"Run" State 344

Main CPU 232 continues operation of control algorithms to operate the engine at no load. Power may be produced from turbine engine 148 for operating control electronics and recharging any energy storage device in energy storage SP and converter 470 for starting. No power is output from output SP and converter 458. A power enable signal transitions the software into "load" state 346. A stop command transitions the system to begin shutdown procedures (may vary depending on operating mode).

"Load" State 346

Main CPU 232 continues operation of control algorithms to operate the turbine engine 148 at the desired load. Load commands are issued through the communications ports, display or system loads. A stop command transitions main CPU 232 to begin shutdown procedures (may vary depending on operating mode). A power disable signal can transition main CPU 232 back to "run" state 344.

"Re-charge" State 334

Systems that have an energy storage option may be required to charge energy storage storage SP and converter 470 to maximum capacity before entering the "warmdown" 348 or "cooldown" 332 states. During "re-charge" state 334, main CPU 232 continues operation of the turbine engine producing power for battery charging and controller supply. No out power is provided. When the energy storage SP and converter 470 has charged, the system transitions to either the "cooldown" 332 or "warmdown" 348 state depending on system fault conditions.

"Cool Down" State 332

"Cool down" state 332 provides the ability to cool the turbine engine 148 after operation and a means of purging fuel from the combustor. After normal operation, software sequences the system into "cool down" state 332. In a typical configuration, turbine engine 148 is motored to a cool down speed of about 45,000 RPM. Airflow continues to move through turbine engine 148 preventing hot air from migrating to mechanical components in the cold section. This motoring process continues until the turbine engine EGT falls below a cool down temperature of about 193° C. (380° F.). Cool down may be entered at much lower than the final cool down temperature when turbine engine 148 fails to light. The engine's combustor requires purging of excess fuel which may remain. The software always operates the cool down cycle for a minimum purge time of 60 seconds. This purge time ensures remaining fuel is evacuated from the combustor. Completion of this process transitions the system into the "shutdown" state 330. For user convenience, the system does not require a completion of the enter "cooldown" state 332 before being able to attempt a restart. Issuing a start command transitions the system into the "restart" state 350.

"Restart" State 350

Turbine engine 148 is configured from the "cool down" state 332 before turbine engine 148 can be restarted. In a typical configuration, the software lowers the engine speed to about 25,000 RPM at a rate of 4,000 RPM/sec. Once the turbine engine speed has reached this level, the software transitions the system into the "open loop light off" state 340 to perform the actual engine start.

"Shutdown" State 330

During the "shutdown" state 330, the turbine engine rotor is brought to rest and system outputs are configured for idle operation. In a typical configuration, the software commands the rotor to rest by lowering the engine speed at a rate of 2,000 RPM/sec or no load condition, whichever is faster. Once the speed reaches about 14,000 RPM, the motor/generator SP and converter 456 is commanded to reduce the turbine engine rotor shaft speed to about 0 RPM in less than 1 second.

"Re-light" State 338

When a system fault occurs where no power is provided from the load/utility grid 60 or energy storage SP and converter 470, the software re-ignites combustion to perform a warm down 348. The motor/generator SP and converter 456 is configured to regulate voltage (power) for the internal DC bus. Fuel is added as defined in the open loop light off fuel control algorithm to ensure combustion occurs. Detection of engine light will transition the system to "warm down" state 348.

"Warm Down" State 348

Fuel is provided when no electric power is available to operate turbine engine 148 at a no load condition to lower the operating temperature in "warm down" state 348. In a typical configuration, engine speed is operated at about 50,000 RPM by supplying fuel through the speed control algorithm. Engine temperatures less than about 343° C. (650° F.) causes the system to transition to "shutdown" state 330.

"Fault" State 334

The present invention disables all outputs placing the system in a safe configuration when faults that prohibit safe operation of the turbine system are present. Operation of system monitoring and communications will continue if the energy is available.

"Disable" State 336

The system disables all outputs placing the system in a safe configuration when faults that prohibit safe operation of the turbine system are present. System monitoring and communications will most likely not continue.

Modes of Operation

The turbine works in two major modes, utility grid-connect and stand-alone. In the utility grid-connect mode, the electric power distribution system i.e., the utility grid, supplies a reference voltage and phase, and the turbine supplies power in synchronism with the utility grid. In the stand-alone mode, the turbine supplies its own reference voltage and phase, and supplies power directly to the load. The power controller switches automatically between the modes.

Within the two major modes of operation are sub-modes. These modes include stand-alone black start, stand-alone transient, utility grid connect and utility grid connect transient. The criteria for selecting an operating mode is based on numerous factors, including but not limited to, the presence of voltage on the output terminals, the black start battery option, and the transient battery option.

Referring to FIG. 14, generator converter 456 and load converter 458 provide an interface for energy source 460 and utility 468, respectively, to DC bus 462. For illustrative purposes, energy source 460 is a turbine including engine 454 and generator 452. Fuel device 474 provides fuel via fuel line 476 to engine 454. Generator converter 456 and load converter 458 operate as customized bi-directional switching converters under the control of controller 472. In particular, controller 472 reconfigures the generator converter 456 and load converter 458 into different configurations to provide for the various modes of operation. These modes include stand-alone black start, stand-alone transient, grid connect and grid connect transient as discussed in detail below. Controller 472 controls the way in which generator 452 and utility 468 sinks or sources power, and DC bus 462 is regulated at any time. In this way, energy source 460, utility/load 468 and energy storage device 470 can be used to supply, store and/or use power in an efficient manner. Controller 472 provides command signals via line 479 to engine 454 to determine the speed of turbine 460. The speed of turbine 460 is maintained through generator 452. Controller 472 also provides command signals via control line 480 to fuel device 474 to maintain the EGT of the engine 454 at its maximum efficiency point. Generator DSP 456 is responsible for maintaining the speed of the turbine 460, but putting current into generator 452 or pulling current out of generator 452.

Referring to FIG. 14, in the stand-alone black start mode, energy storage device 470, such as a battery, is provided for starting purposes while energy source 460, such as turbine including engine 454 and generator 452, supplies all transient and steady state energy. Referring to TABLE 3, controls for a typical stand-alone black start mode are shown.

TABLE 3

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | — |
| Stand By | — | — | — | DC Bus |
| Prepare to Start | — | — | — | DC Bus |
| Bearing Lift Off | — | RPM | — | DC Bus |
| Open Loop Light Off | Open Loop Light | RPM | — | DC Bus |
| Closed Loop Accel | EGT | RPM | — | DC Bus |
| Run | Speed | DC Bus | — | SOC |
| Load | Speed | DC Bus | Voltage | SOC |
| Recharge | Speed | DC Bus | — | SOC |
| Cool Down | — | RPM | — | DC Bus |
| Restart | — | RPM | — | DC Bus |
| Shutdown | — | RPM | — | DC Bus |
| Re-light | Speed | DC Bus | — | — |
| Warm Down | Speed | DC Bus | — | — |
| Fault | — | — | — | — |
| Disable | — | — | — | — |

Stand-alone Transient

In the stand-alone transient mode, storage device 479 is provided for the purpose of starting and assisting the energy source 460, in this example the turbine engine 148 and motor/generator 100, to supply maximum rated output power during transient conditions. Storage device 479, typically a battery, is always attached to DC bus 66 during operation, supplying energy in the form of current to maintain the voltage on DC bus 66. Output SP and converter 458 provides a constant voltage source when producing output power. As a result, load/utility grid 60 is always supplied the proper AC voltage value that it requires. Referring to TABLE 4, controls for a typical stand-alone transient mode are shown.

TABLE 4

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | — |
| Stand By | — | — | — | DC Bus |
| Prepare to Start | — | — | — | DC Bus |
| Bearing Lift Off | — | RPM | — | DC Bus |
| Open Loop Light Off | Open Loop Light | RPM | — | DC Bus |
| Closed Loop Accel | EGT | RPM | — | DC Bus |
| Run | Power & EGT | RPM | — | DC Bus |
| Load | Power & EGT | RPM | Voltage | DC Bus |
| Recharge | Power & EGT | RPM | — | DC Bus |
| Cool Down | — | RPM | — | DC Bus |
| Restart | — | RPM | — | DC Bus |
| Shutdown | — | RPM | — | DC Bus |
| Re-light | Speed | DC Bus | — | — |
| Warm Down | Speed | DC Bus | — | — |
| Fault | — | — | — | — |
| Disable | — | — | — | — |

Utility Grid Connect

Referring to FIG. 14, in the utility grid connect mode, the energy source 460, in this example turbine engine 454 driving generator 452, is connected to the load/utility grid 468 providing load leveling and management where transients are handled by the load/utility grid 468. The system operates as a current source, pumping current into load/utility grid 60. Referring to TABLE 5, controls for a typical utility grid connect mode are shown.

TABLE 5

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | N/A |
| StandBy | — | — | — | N/A |

TABLE 5-continued

| SYSTEM STATE | ENGINE CONTROLS | MOTOR CONTROLS | CONVERTER CONTROLS | ENERGY STORAGE CONTROLS |
|---|---|---|---|---|
| Prepare to Start | — | — | DC Bus | N/A |
| Bearing Lift Off | — | RPM | DC Bus | N/A |
| Open Loop Light Off | Open Loop Light | RPM | DC Bus | N/A |
| Closed Loopl Accel | EGT | RPM | DC Bus | N/A |
| Run | Power & EGT | RPM | DC Bus | N/A |
| Load | Power & EGT | RPM | DC Bus | N/A |
| Recharge | N/A | N/A | N/A | N/A |
| Cool Down | — | RPM | DC Bus | N/A |
| Restart | — | RPM | DC Bus | N/A |
| Shutdown | — | RPM | DC Bus | N/A |
| Re-light | Speed | DC Bus | — | N/A |
| Warm Down | Speed | DC Bus | — | N/A |
| Fault | — | — | — | N/A |
| Disable | — | — | — | N/A |

Utility Grid Connect Transient

In the utility grid connect transient mode, the energy source 460, such as turbine engine 454 and motor/generator 452, is connected to the load/utility grid 468 providing load leveling and management. The energy source 460 is assisted by energy storage SP and converter 470 to handle transients. The system operates as a current source, pumping current into load/utility grid 60 with the assistance of energy storage SP and converter 470. Referring to TABLE 6, controls for a typical utility grid connect transient mode are shown.

TABLE 6

| SYSTEM STATE | ENGINE CONTROLS | MOTOR CONTROLS | CONVERTER CONTROLS | ENERGY STORAGE CONTROLS |
|---|---|---|---|---|
| Power Up | — | — | — | — |
| Stand By | — | — | — | DC Bus |
| Prepare to Start | — | — | — | DC Bus |
| Bearing Lift Off | — | RPM | — | DC Bus |
| Open Loop Light Off | Open Loop Light | RPM | — | DC Bus |
| Closed Loop Accel | EGT | RPM | — | DC Bus |
| Run | Power & EGT | RPM | — | DC Bus |
| Load | Power & EGT | RPM | Current | DC Bus |
| Recharge | Power & EGT | RPM | — | DC Bus |
| Cool Down | — | RPM | — | DC Bus |
| Restart | — | RPM | — | DC Bus |
| Shutdown | — | RPM | — | DC Bus |
| Re-light | Speed | DC Bus | — | — |
| Warm Down | Speed | DC Bus | — | — |
| Fault | — | — | — | — |
| Disable | — | — | — | — |

Multi-pack Operation

Referring now to FIG. 15m, in accordance with the present invention, the power controller can operate in a single or multi-pack configuration. In particular, the If power controller is capable of sequencing multiple systems in addition to being a controller for a single turbogenerator. Referring to FIG. 15, for illustrative purposes, multi-pack system 510 including three power controllers 518, 520 and 522 is shown. The ability to control multiple controllers 518, 520 and 522 is made possible through digital communications interface and control logic contained in each controllers main CPU (not shown).

Two communications busses 530 and 534 are used to create the intercontroller digital communications interface for multi-pack operation. One bus 534 is used for slower data exchange while the other bus 530 generates synchronization packets at a faster rate. In a typical implementation, for example, an IEEE-502.3 bus 530 links each of the controllers 518, 520 and 522 together for slower communications including data acquisition, start, stop, power demand and mode selection functionality. An RS485 bus links each of the systems together providing synchronization of the output power waveforms.

One skilled in the art will recognize that the number of power controllers that can be connected together is not limited to three, but rather any number of controllers can be connected together in a multi-pack configuration. Each power controller 518, 520 and 522 includes its own energy storage device 524, 526 and 528, respectively, such as a battery. In accordance with another embodiment of the invention, power controllers 518, 520 and 522 can all be connected to the same single energy storage device (not shown), typically a very large energy storage device which would be rated too big for an individual turbine. Distribution panel 532, typically comprised of circuit breakers, provides for distribution of energy.

Multi-pack control logic determines at power up that one controller is the master and the other controllers become slave devices. The master is in charge of handling all user-input commands, initiating all inter-system communications transactions, and dispatching units. While all controllers 518, 520 and 522 contain the functionality to be a master, to alleviate control and bus contention, one controller is designated as the master.

At power up, the individual controllers 518, 520 and 522 determine what external input devices they have connected. When a controller contains a minimum number of input devices it sends a transmission on intercontroller bus 530 claiming to be master. All controllers 518, 520 and 522 claiming to be a master begin resolving who should be master. Once a master is chosen, an address resolution protocol is executed to assign addresses to each slave system. After choosing the master and assigning slave addresses, multi-pack system 510 can begin operating.

A co-master is also selected during the master and address resolution cycle. The job of the co-master is to act like a slave during normal operations. The co-master should receive a constant transmission packet from the master indicating that the master is still operating correctly. When this packet is not received within a safe time period, 20 ms for example, the co-master may immediately become the master and take over master control responsibilities.

Logic in the master configures all slave turbogenerator systems. Slaves are selected to be either utility grid-connect (current source) or standalone (voltage source). A master controller, when selected, will communicate with its output converter logic (converter SP) that this system is a master. The converter SP is then responsible for transmitting packets over the intercontroller bus 530, synchronizing the output waveforms with all slave systems. Transmitted packets will include at least the angle of the output waveform and error-checking information with transmission expected every quarter cycle to one cycle.

Master control logic will dispatch units based on one of three modes of operation: (1) peak shaving, (2) load following, or (3) base load. Peak shaving measures the total power consumption in a building or application using a power meter, and the multi-pack system 510 reduces the utility consumption of a fixed load, thereby reducing the utility rate schedule and increasing the overall economic return of the turbogenerator. Load following is a subset of peak shaving where a power meter measures the total power consumption in a building or application and the multi-pack system 510 reduces the utility consumption to zero load. In base load, the multi-pack system 510 provides a fixed load and the utility supplements the load in a building or application. Each of these control modes require different control strategies to optimize the total operating efficiency.

A minimum number of input devices are typically desired for a system 510 to claim it is a master during the master resolution process. Input devices that are looked for include a display panel, an active RS232 connection and a power meter connected to the option port. Multi-pack system 510 typically requires a display panel or RS232 connection for receiving user-input commands and power meter for load following or peak shaving.

In accordance with the present invention, the master control logic dispatches controllers based on operating time. This would involve turning off controllers that have been operating for long periods of time and turning on controllers with less operating time, thereby reducing wear on specific systems.

Utility Grid Analysis and Transient Ride Through

Figure 16:
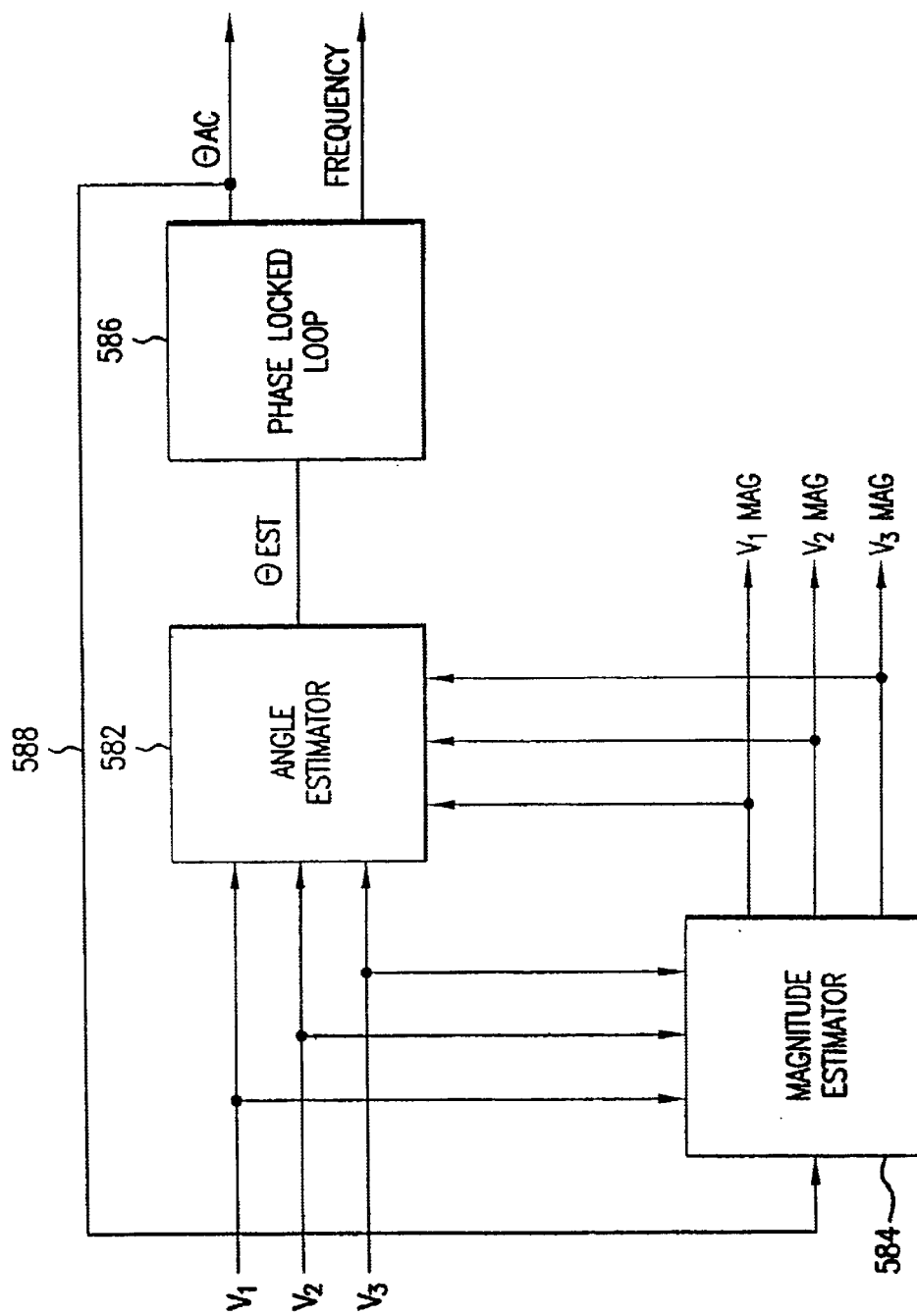
FIG. 16 is a block diagram of a utility grid analysis system for the power controller according to the present invention.
Figure 17:
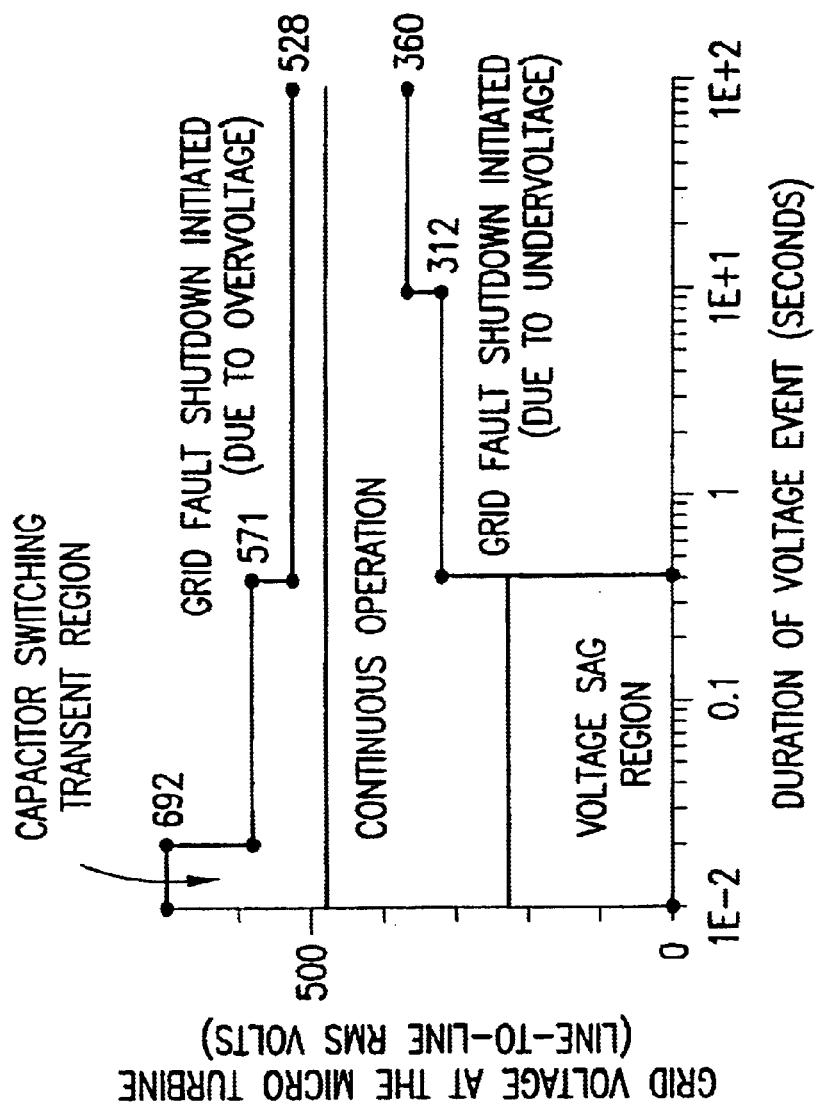
FIG. 17 is a graph of voltage against time for the utility grid analysis system illustrated in FIG. 16.
Figure 18:
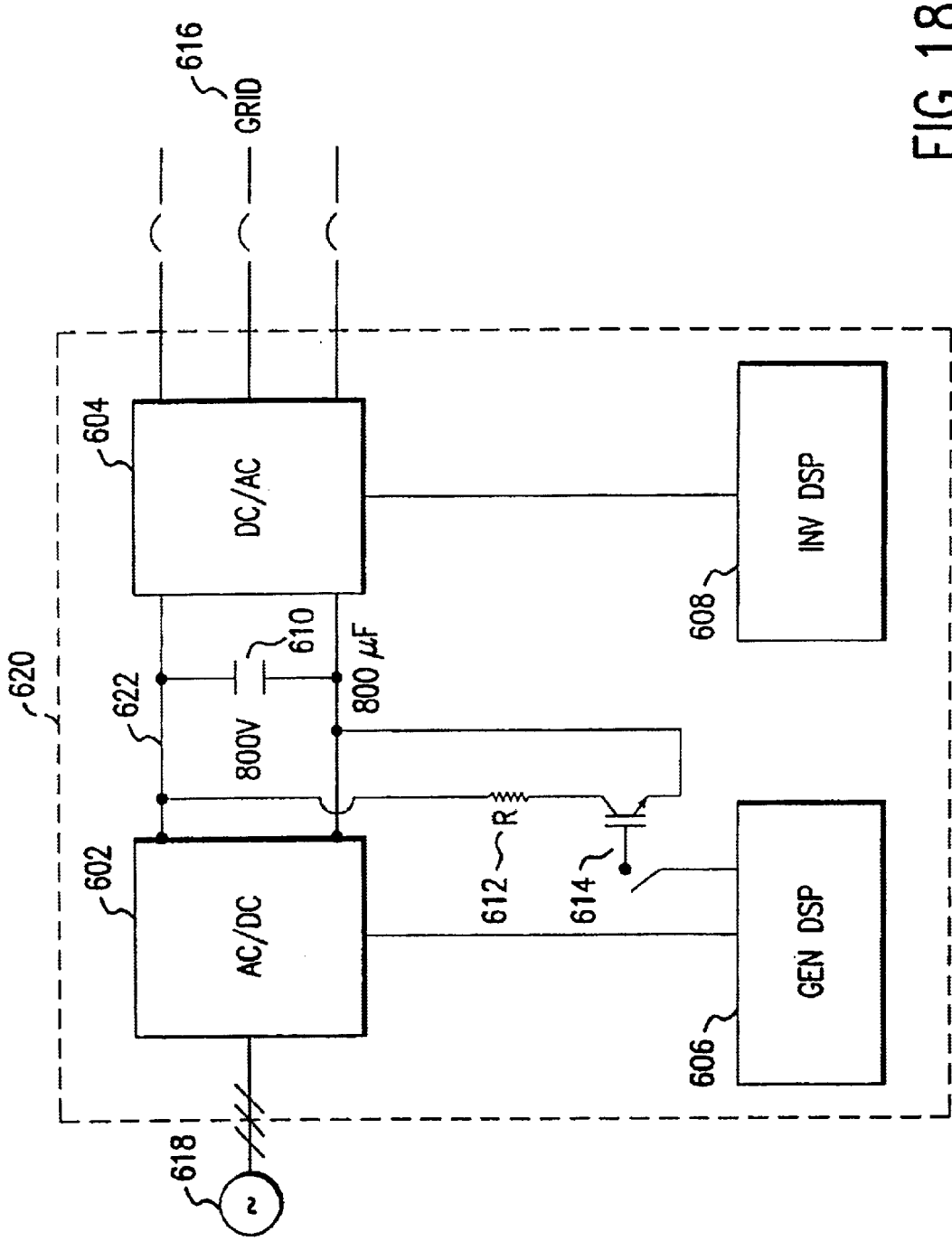
FIG. 18 is a diagram of the power controller according to the present invention, including brake resistor 612 and brake resistor modulation switch 614.

Referring to FIGS. 16–18, transient handling system 580 for power controller 620 is illustrated. Transient handling system 580 allows power controller 620 to ride through transients which are associated with switching of correction capacitors (not shown) on utility grid 616 which causes voltage spikes followed by ringing. Transient handling system 580 also allows ride through of other faults, including but not limited to, short circuit faults on utility grid 616, which cleared successfully, cause voltage sags. Transient handling system 580 is particularly effective towards handling transients associated with digital controllers, which generally have a slower current response rate due to A/D conversion sampling. During a transient, a large change in the current can occur in between A/D conversions. The high voltage impulse caused by transients typically causes an over current in digital power controllers.

Referring in particular to FIG. 17, a graph 590 showing transients typically present on utility grid 616 is shown. The duration of a voltage transient, measured in seconds, is shown on the x-axis and its magnitude, measured in volts, is shown on the y-axis. A capacitor switching transient, such as shown at 592, which is relatively high in magnitude (up to about 200%) and short in duration (somewhere between 1 and 20 milliseconds) could be problematic to operation of a power controller.

Referring to FIGS. 16–18, changes on utility grid 616 are reflected as changes in the magnitude of the voltage. In particular, the type and seriousness of any fault or event on utility grid 616 can be determined by magnitude estimator 584, which monitors the magnitude and duration of any change on utility grid 616.

In accordance with the present invention, the effect of voltage transients can be minimized by monitoring the current such that when it exceeds a predetermined level, switching is stopped so that the current can decay, thereby preventing the current from exceeding its predetermined level. The present invention thus takes advantage of analog over current detection circuits that have a faster response than transient detection based on digital sampling of current and voltage. Longer duration transients indicate abnormal utility grid conditions. These must be detected so power controller 620 can shut down in a safe manner. In accordance with the present invention, algorithms used to operate power controller 620 provide protection against islanding of power controller 620 in the absence of utility-supplied grid voltage. Near short or near open islands are detected within milliseconds through loss of current control. Islands whose load is more closely matched to the power controller output load will be detected through abnormal voltage magnitudes and frequencies as detected by magnitude estimator 584.

In particular, referring to FIG. 18, power controller 620 includes brake resistor 612 connected across DC bus 622. Brake resistor 612 acts as a resistive load, absorbing energy when converter SP 608 is turned off. In operation, when converter SP 608 is turned off, power is no longer exchanged with utility grid 616, but power is still being received from the turbine, which is absorbed by brake resistor 612. The present invention detects the DC voltage between generator and converter SPs 606 and 608. When the voltage starts to rise, brake resistor 612 is turned on to allow it to absorb energy.

In a typical configuration, generator 618 produces three phases of AC at variable frequencies. AC/DC converter 602 under the control of motor generator converter SP 606 converts the AC to DC which is then applied to DC bus 622 (regulated for example at 800 vDC) which is supported by capacitor 610 (for example, at 800 microfarads with two milliseconds of energy storage). DC/AC converter 604, under the control of converter SP 608, converts the DC into three-phase AC, and applies it to utility grid 616. In accordance with the present invention, current from DC bus 622 can by dissipated in brake resistor 612 via modulation of switch 614 operating under the control of motor/generator converter and SP 606. Switch 614 may be an IGBT switch, although one skilled in the art will recognize that other conventional or newly developed switches may be utilized as well.

Motor/generator SP and converter 606 controls switch 614 in accordance to the magnitude of the voltage on DC bus 622. The bus voltage of DC bus 622 is typically maintained by converter SP 608, which shuttles power in and out of utility grid 616 to keep DC bus 622 regulated at, for example, 800 vDC. When converter SP 608 is turned off, it no longer is able to maintain the voltage of DC bus 622, so power coming in from the motor causes bus voltage of DC bus 622 to rise quickly. The rise in voltage is detected by motor SP 606, which turns on brake resistor 612 and modulates it on and off until the bus voltage is restored to its desired voltage, for example, 800 vDC. Converter SP 608 detects when the utility grid transient has dissipated, i.e., AC current has decayed to zero, and restarts the converter side of power controller 620. Brake resistor 612 is sized so that it can ride through the transient and the time taken to restart converter.

Referring to FIGS. 16 and 18, in accordance with the present invention, both the voltage and zero crossings (to determine where the AC waveform of utility grid 616 crosses zero) are monitored to provide an accurate model of utility grid 616. Utility grid analysis system includes angle estimator 582, magnitude estimator 584 and phase locked loop 586. The present invention continuously monitors utility grid voltage and based on these measurements, estimates the utility grid angle, thus facilitating recognition of under/over voltages and sudden transients. Current limits are set to disable DC/AC converter 604 when current exceeds a maximum and wait until current decays to an acceptable level. The result of measuring the current and cutting it off is to allow DC/AC converter 604 to ride through transients better. Thus when DC/AC converter 608 is no longer exchanging power with utility grid 616, power is dissipated in brake resistor 612.

In accordance with the present invention, converter SP 608 is capable of monitoring the voltage and current at utility grid 616 simultaneously. In particular, power controller 620 includes a utility grid analysis algorithm. One skilled in the art will recognize that estimates of the utility grid angle and magnitude may be derived via conventional algorithms or means. The true utility grid angle $0_{AC}$, which is the angle of the generating source, cycles through from 0 to $2\Pi$ and back to 0 at a rate of 60 hertz. The voltage magnitude estimates of the three phases are designated $V_{1\ mag}$, $V_{2\ mag}$ and $V_{3\ mag}$ and the voltage measurement of the three phases are designated $V_1$, $V_2$ and $V_3$.

A waveform, constructed based upon the estimates of the magnitude and angle for each phase, indicates what a correct measurement would look like. For example, using the first of the three phase voltages, the cosine of the true utility grid angle $0_{AC}$ is multiplied by the voltage magnitude estimate $V_{1\ mag}$, with the product being a cosine-like waveform. Ideally, the product would be voltage measurement $V_1$.

Feedback loop 588 uses the difference between the absolute magnitude of the measurement of $V_1$ and of the constructed waveform to adjusts the magnitude of the magnitude estimate $V_{1\ mag}$. One skilled in the art will recognize that the other two phases of three-phase signal can be adjusted similarly, with different angle templates corresponding to different phases of the signal. Thus, magnitude estimate $V_{1\ mag}$ and angle estimate $0_{EST}$ are used to update magnitude estimate $V_{1\ mag}$. Voltage magnitude estimates $V_{1\ mag}$, $V_{2\ mag}$ and $V_{3\ mag}$ are steady state values used in a feedback configuration to track the magnitude of voltage measurements $V_1$, $V_2$ and $V_3$. By dividing the measured voltages $V_1$ by the estimates of the magnitude $V_{1\ mag}$, the cosine of the angle for the first phase can be determined (similarly, the cosine of the angles of the other signals will be similarly determined).

In accordance with the present invention, the most advantageous estimate for the cosine of the angle, generally the one that is changing the most rapidly, is chosen to determine the instantaneous measured angle. In most cases, the phase that has an estimate for the cosine of an angle closest to zero is selected since it yields the greatest accuracy. Utility grid analysis system 580 thus includes logic to select which one of the cosines to use. The angle chosen is applied to angle estimator 582, from which an estimate of the instantaneous angle $0_{EST}$ of utility grid 616 is calculated and applied to phase locked loop 586 to produce a filtered frequency. The angle is thus differentiated to form a frequency that is then passed through a low pass filter (not shown). Phase locked loop 586 integrates the frequency and also locks the phase of the estimated instantaneous angle $0_{EST}$, which may have changed in phase due to differentiation and integration, to the phase of true utility grid angle $0_{AC}$.

In a typical operation, when the phase changes suddenly on measured voltage $V_1$, the algorithm of the present invention compares the product of the magnitude estimate $V_1$ mag and the cosine of true utility grid angle $0_{AC}$ against the real magnitude multiplied by the cosine of a different angle. A sudden jump in magnitude would be realized.

Thus, three reasonably constant DC voltage magnitude estimates are generated. A change in one of those voltages indicates whether the transient present on utility grid 616 is substantial or not. One skilled in the art will recognize that there are a number of ways to determine whether a transient is substantial or not, i.e. whether abnormal conditions exist on the utility grid system, which require power controller 620 to shut down. A transient can be deemed substantial based upon the size of the voltage magnitude and duration. Examples of the criteria for shutting down power controller 620 are shown in FIG. 17. Detection of abnormal utility grid behavior can also be determined by examining the frequency estimate.

On detecting abnormal utility grid behavior, a utility grid fault shutdown is initiated. When system controller 620 initiates a utility grid fault shutdown, output contactor is opened within a predetermined period of time, for example, 100 msec, and the main fuel trip solenoid (not shown) is closed, removing fuel from the turbogenerator. A warm shutdown ensues during which control power is supplied from motor/generator 618 as it slows down. In a typical configuration, the warm-down lasts about 1–2 minutes before the rotor (not shown) is stopped. The control software does not allow a restart until utility grid voltage and frequency are within permitted limits.

Figure 19:
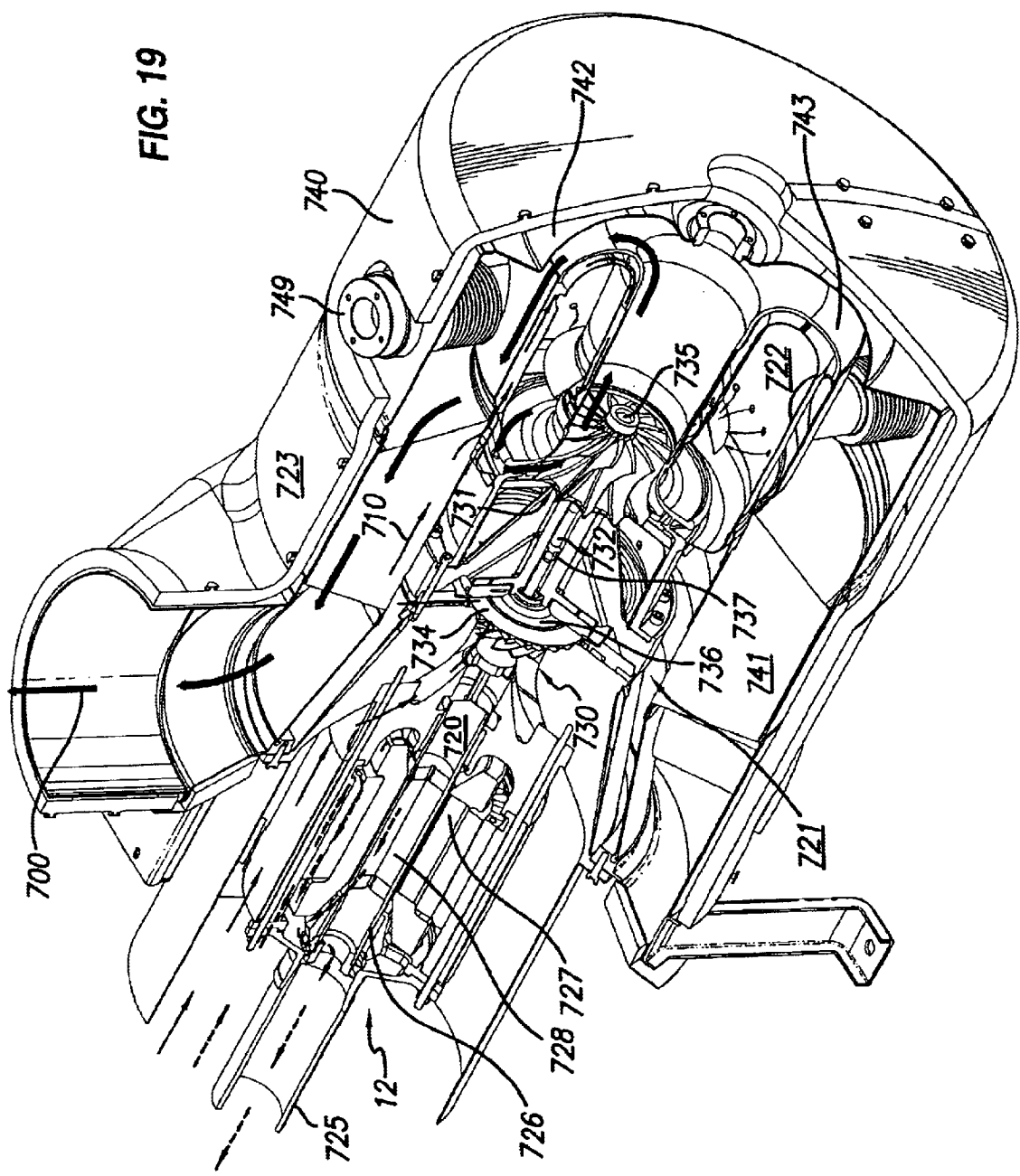
FIG. 19 is a perspective view, partially in section, of a turbogenerator system used with a power controller according to the present invention.

Referring now to FIG. 19, in one embodiment of the present invention, energy source 12 is an integrated turbogenerator system that generally includes motor/generator 720, power head 721, combustor 722, and recuperator (or heat exchanger) 723. Power head 721 of turbogenerator 12 includes compressor 730, turbine 731, and common shaft 732. Compressor 730 includes compressor impeller or wheel 734 that draws air through an annular air flow passage in motor/generator 720. Turbine 731 includes turbine wheel 735 that receives hot exhaust gas flowing from combustor 722. Combustor 722 receives preheated air from recuperator 723 and fuel through a plurality of fuel injectors in fuel injector guides 749. Compressor wheel 34 and turbine wheel 35 are supported on common shaft or rotor 732 having radially extending air-flow bearing rotor thrust disk 736. Common shaft 732 is rotatably supported by a single airflow journal bearing within center bearing housing 737 while bearing rotor thrust disk 736 at the compressor end of common shaft 732 is rotatably supported by a bilateral air-flow thrust bearing.

Motor/generator 720 includes magnetic rotor or sleeve 726 rotatably supported within generator stator 727 by a pair of spaced journal bearings. Both rotor 726 and stator 727 may include permanent magnets such as permanent magnet 728 within rotor 726. Air is drawn by the rotation of rotor 726 and travels between rotor 726 and stator 727 and further through an annular space formed radially outward of the stator to cool generator 720. Inner sleeve 725 serves to separate the air expelled by rotor 726 from the air being drawn in by compressor 730, thereby preventing preheated air from being drawn in by the compressor and adversely affecting the performance of the compressor (due to the lower density of preheated air compared to ambient-temperature air).

In operation, air is drawn through the outer sleeve by compressor 730, compressed, and directed to flow into recuperator 723. Recuperator 723 includes annular housing 740 with heat transfer section or core 741, exhaust gas dome 742, and combustor dome 743. Heat from exhaust gas 710 exiting turbine 731 is used to preheat compressed air 700 flowing through recuperator 723 before it enters combustor 722, where the preheated air is mixed with fuel and ignited such as by electrical spark, hot surface ignition, or catalyst. The fuel may also be premixed with all or a portion of the preheated air prior to injection into the combustor. The resulting combustion gas expands in turbine 731 to drive turbine impeller 735 and, through common shaft 732, drive compressor 730 and rotor 726 of generator 720. The expanded turbine exhaust gas 700 then exits turbine 731 and flows through recuperator 723 before being discharged from turbogenerator 12.

Many parameters can influence the amount of power produced by a particular combustion gas turbine design, including turbine speed, combustion temperature, intake air temperature and intake air pressure. When the other parameters are held constant, power output typically decreases as the intake air temperature is increased, but increases as the air intake pressure is increased. These effects are preferably taken into account in the design of an air intake system for a combustion gas turbine.

Within a combustion gas turbine, the compressor typically has a region of instability. The boundary of the unstable region is termed a "surge line." Combustion gas turbines are preferably operated on the stable side of the surge line. The "surge margin" is a term that references how far away the operating point of a combustion gas turbine is from the surge line. Many parameters influence the size of a surge margin for a particular combustion gas turbine design, including turbine speed, combustion temperature, intake air temperature and intake air pressure. When the other parameters are held constant, the surge margin generally increases as the intake air temperature is increased. The surge margin is usually lower during certain transient events than during the steady state operation of a combustion gas turbine. Sufficient surge margin is therefore preferably included in the design of a system to cover both steady-state and anticipated transient events. Increasing the surge margin of a combustion gas turbine design, however, can reduce output power and efficiency, and increase the cost of the unit.

Referring again to FIG. 19, under steady-state operating conditions the torque produced by turbine 731 is typically balanced with the torque required by electric generator 720. In a generator off-load event the torque required by electric generator 720 is suddenly reduced and the speed of turbine 731 will characteristically begin to increase. In many embodiments of combustion gas turbine 731, output torque increases with increasing speed. Accordingly, the turbine may over-speed following a generator off-load. The effect is particularly pronounced in microturbine power generators that operate at high speed and have low inertia. To counteract this tendency to over-speed, the fuel flow is preferably reduced rapidly following generator off-load. Sudden reductions in fuel flow can cause problems with flame stability, particularly in gas turbines with low emissions combustion systems that operate at very lean conditions (high air-to-fuel ratio, or, low fuel-to-air ratio). Flame stability problems are compounded in recuperated combustion gas turbines, where a significant proportion of the heat energy may be supplied to the compressed air stream by the recuperator. Recuperators such as recuperator 723 may have long thermal time constants and may maintain near constant air stream exit temperature for many seconds after generator off-load. A recuperated gas turbine may therefore require an even larger reduction in the fuel flow to prevent over-speed following a generator off-load. In a generator with a recuperated cycle, the resulting fuel-to-air ratio is particularly susceptible to falling below the level required to sustain combustion.

With reference again to FIG. 18, the electrical load supplied by generator 618 may be utility grid 616 or may be an external device that can have a variable power demand profile. This power demand profile may contain large and sudden off-loads. If the power profile of the external load 616 is applied directly to generator 618, the above-described over-speed and flame stability problems are more likely to occur following offloads.

Application of a controllable dynamic brake resistor such as brake resistor 612 to the output of generator 618 as described above can help avoid over-speed conditions while simultaneously minimizing flame stability problems following offloads. Dynamic brake resistor 612 may be configured to dissipate a controlled amount of the power that is produced by generator 618. In a microturbine power generator with a dynamic brake resistor, the combustion gas turbine output power may be reduced at a controlled rate following a large and sudden off-load. The power produced by generator 618 that is in excess of the load power demand may be dissipated in dynamic brake resistor 612.

When power is dissipated within dynamic brake resistor 612, the resistor typically increases in temperature. To provide sustained operation, dynamic brake resistor 612 preferably is provided with some form of cooling. For example, dynamic brake resistor 612 may be cooled by a stream of gas at a lower temperature than the resistor. Fans or blowers can be used to provide the stream of cooling gas, although fans and blowers may add cost, may cause reliability issues, and consume some of the power produced by generator 618. Airborne particles and water droplets may cause damage, loss of performance or electrical faults within dynamic brake resistor 612. Therefore, it is beneficial that the cooling gas is filtered before it passes over dynamic brake resistor 612. Filtering is particularly helpful when turbogenerator 12 is mounted in a hybrid electric vehicle, where spray and dust can be severe.

A number of synergistic benefits may be achieved by combining the air intake to turbogenerator 12 with dynamic brake resistor 612. In one embodiment according to the invention, and with reference to FIGS. 18 and 19, turbine 731 may be used to drive generator 720 while dynamic brake resistor 612 may be used to dissipate excess power from the generator and heat the air ingested by the turbine. A resistive heating element such as dynamic brake resistor 612 may be used as a part of a controlled dynamic brake for turbogenerator 12. The dynamic brake resistor 214 may be cooled by the filtered air-stream drawn into compressor 730. This may eliminate the need for fans or blowers and filters dedicated to a dynamic brake system.

When used as a part of a controlled dynamic brake, dynamic brake resistor 612 dissipates excess power from generator 720. During this process the dynamic brake resistor 612 may increase in temperature. In such a scenario, the temperature of the air flowing over dynamic brake resistor 612 toward the intake of compressor 40 will therefore also increase, lowering the overall output power of turbogenerator 12. This in turn will reduce the excess power from generator 720, which will in turn result in less power being dissipated in dynamic brake resistor 612 than if the resistor were not integrated with the air intake to compressor 730.

Raising the temperature of the air flowing into compressor 730 by dissipating power in dynamic brake resistor 612 may additionally also increase the surge margin of turbine 731. When a resistive heating element is used as part of a controlled dynamic brake, the combustion gas turbine surge margin may be improved during off-loads as a result of the dissipation of excess power from the electric generator. Also, surge margins may be improved in cold ambient conditions by continuously dissipating power in a resistive heating element.

Figure 20:
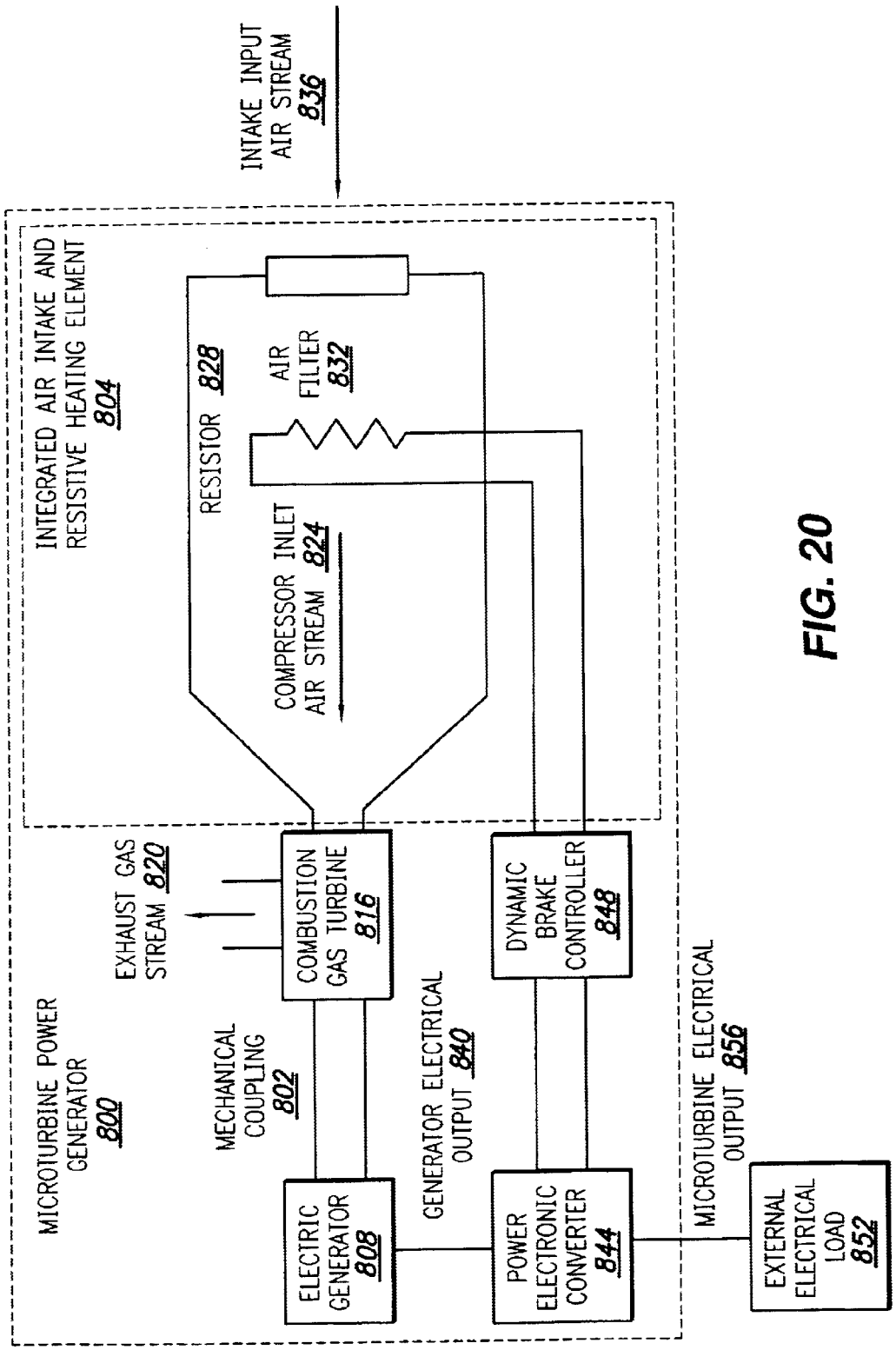
FIG. 20 is a block diagram schematic of a microturbine power generator having an integrated brake resistor and air intake.

Referring now to FIG. 20, an embodiment of a turbogenerator according to the invention is conceptually illustrated and includes microturbine power generator 800 having integrated brake resistor and air intake 804. Microturbine power generator 800 produces electrical power output 856 that is used to supply electric power to external electrical load 852. Microturbine power generator 800 preferably contains integrated air intake and resistive heating element 804, and combustion gas turbine 816 which delivers mechanical power to electric generator 808 via mechanical coupling 802. As previously described, electric generator 308 converts mechanical power into electric power that is supplied to generator electrical output 840. The generator electrical output 840 is preferably processed and conditioned by electronic power converter 844 to produce microturbine power generator electrical output 856. Electronic power converter 844 also preferably provides electric power to the dynamic brake controller 848. In other embodiments, generator electrical output 840 may be supplied directly to external load 3852 and dynamic brake controller 848.

Integrated air intake and resistive heating element 804 may filter and then duct air into compressor air intake 860 of combustion gas turbine 816. Integrated air intake and resistive heating element 804 may contain air filter 832 to filter air and optionally other gases, and further contains resistive heating element 828. Air is drawn through integrated air intake and resistive heating element 804 by the pressure drop caused at the compressor air intake of combustion gas turbine 816. Therefore, additional fans or blowers may not be required to propel the air through air filter 832, although the pressure drop across the air filter 332 may result in some small loss of output power and efficiency. Intake input air stream 836 passes through air filter 832, which preferably removes dust and water droplets from intake input air stream 836. Air filter 832 may prevent erosion or the build up of solid material in microturbine power generator 800. The resulting clean air stream then flows over resistive heating element 828. Any power being dissipated in resistive heating element 828 will elevate the temperature of the air stream. After passing over resistive heating element 828 the air stream becomes compressor inlet air stream 824, which is ducted into compressor inlet 860 of combustion gas turbine 816. After passing through combustion gas turbine 816, the air stream and combustion products are discharged as exhaust gas stream 820.

Resistive heating element 828 may be supplied with electric power from dynamic brake controller 848. When the generator electrical output 840 exceeds the amount required to supply external electrical load 852, dynamic brake controller 848 dissipates excess electrical power in resistive heating element 828. This causes the temperature of resistive heating element 828 to increase, which in turn increases the temperature of compressor inlet air stream 824. The elevated temperature of compressor inlet air stream 824 reduces the output power and increases the surge margin of combustion gas turbine 816.

Combustion gas turbine 816 typically has a non-zero minimum power output at which it can operate. When the power demand of external electrical load 852 is low or zero, the generator electrical output 840 needed to provide power to external electrical load 852 can be lower than generator electrical output 840 with combustion gas turbine 816 operating at minimum power output. Therefore an excess of generator electrical output is created. Dynamic brake controller 848 dissipates this excess power in resistive heating element 828. As a result of the electrical power dissipated in resistive heating element 828, the temperature of compressor inlet air stream 824 is increased. This reduces the output power from combustion gas turbine 816 and therefore also reduces the excess of generator electrical output 840. Thus, less energy is likely to be dissipated using the dynamic brake with integrated resistive heating element 828 of the invention than would be dissipated using most non-integrated brake resistors. The foregoing system therefore preferably reduces the required brake resistor steady-state thermal capacity and may also reduce the energy consumption of combustion gas turbine 816 at minimum output power.

External electrical load 852 may be subject to substantial and sudden reductions in power demand. Following such an off-load event the operational parameters of combustion gas turbine 816 may be adjusted so that the generator electrical output 840 falls to the level required to meet the new power demand of external electrical load 852. The reduction in generator electrical output 840 may be carried out at a controlled rate limited by the characteristics of combustion gas turbine 816, including, for example, combustion stability, mechanical inertia and surge stability. In certain off-load events the power profile of external electrical load 852 may fall faster than the generator electrical output 840 can be reduced. During the off-load transient an excess of generator electrical output 840 is created. As previously described, dynamic brake controller 848 dissipates the excess power in the resistive heating element 828 and thus the temperature of compressor inlet air stream 824 increases, which reduces the output power from combustion gas turbine 816 and therefore the excess of generator electrical output 840. Throughout the off-load transient, less energy may be dissipated when the dynamic brake uses integrated resistive heating element 804 than with embodiments employing a non-integrated brake resistor. With the above-described embodiment, the required brake resistor transient thermal capacity may be reduced and the transient efficiency of the microturbine power generator 800 may be increased. In addition, the surge margin of the combustion gas turbine 816 during off-loads may be improved, due to the elevated temperature of compressor inlet air stream 824.

With continued reference to FIG. 20, in a further embodiment of the invention dynamic brake controller 848 may also be programmed to increase the temperature of compressor inlet air stream 824 by dissipating power in resistive heating element 828 at any time when the surge margin of combustion gas turbine 86 is low, such as when it falls below a predetermined minimum surge margin. In other embodiments, dynamic brake controller 848 may be programmed to dissipate power in resistive heating element 828 only during transient events.

The foregoing air intake with integrated resistive heating element may provide improved surge margin to a combustion gas turbine, even in embodiments in which the electrical power is supplied from an external source rather than being generated using the combustion gas turbine mechanical output. The resistive heating element may be in a direct-current or single-phase configuration, or alternatively could be employed in a multiphase configuration. In other embodiments, a variety of types of energy sinks can assume the role of resistive heating element 828. In one embodiment, intake input air stream 836 may be heated using an integrated, non-resistive heating element.

In another aspect of the invention, algorithms for maximizing the stability of combustion systems for varying ambient and other possible system conditions may advantageously be employed in combination with the above-described systems, including in a turbogenerator having an integrated brake resistor and air intake as described above. The control algorithm used with these systems is preferably a software algorithm that is compatible with standalone controls. One embodiment of such an algorithm may permit a standalone system to offload at the same speed rate (i.e. deceleration rate) as a grid connect system when possible, and when not possible to control the speed offload rate by holding the temperature of resistive heating element 828 at or substantially at its maximum limit. Embodiments of such a control algorithm may permit improvement of system operating stability for a given hardware configuration.

Flame stability in combustion systems is usually better for standalone configurations than for grid connect configurations. The stability of a standalone system is typically most taxed during an offload from full power to an idle condition. Stability limitations are imposed by factors including the capacity of resistive heating element 828 to dissipate power once energy storage devices associated with the system are fully charged, in contrast to the operation of grid connect systems where there may be no power dissipation limits during normal operation. Optimization of the offload sequence for standalone operation may assist in maintaining the stability of microturbine power generator 800 during offload.

At least two limits may affect the ability of a standalone system to offload without flaming out. The first is the stability limit of combustion gas turbine 816, which changes with engine conditions. The second is the temperature of resistive heating element 828, which will typically have a physical constant limit. One method according to the invention for controlling microturbine power generator 800 in a standalone configuration during offload is to maintain a constant, slow offload limit and to increase this limit as necessary to prevent resistive heating element 828 from exceeding its temperature limit. This technique may allow software controls to maximize the offload stability of the system, for most or all offloads, by maintaining resistive heating element 828 at its specified limit as often as necessary.

The offload rate is preferably limited by a speed control loop that allows a predetermined maximum rate of deceleration. Typically, the speed of electric generator 808 is approximately proportional to the power it generates and accordingly the deceleration rate may essentially also be indicative of a power reduction rate. In some embodiments, during a standalone offload, the resistive heating element 828 may be required to dissipate all the power from electric generator 808 once energy storage devices associated with the system, such as batteries, are at full capacity. Having a faster offload rate may typically lower the amount of energy that must be dissipated in resistive heating element 828. The offload rate of the grid connect controls is preferably the same, or approximately the same, for the standalone offload because the foregoing control technique increases the offload rate as necessary while preventing resistive heating element 828 from exceeding its predetermined temperature limit.

To further increase operating stability of microturbine power generator 800, the offload limit may be reduced while operating combustor 722 on two fuel injectors because this is the configuration in which stability becomes a particularly significant issue for certain embodiments of microturbine power generator 800. Stability in injector configurations other than two-injector configurations may be improved with a change to the switch point value of the fuel injectors. The switch point is the point at which the fuel-to-air ratio of the air/fuel mixture injected into combustor 722 through the fuel injectors is changed to improve flame stability. Further, the offload rate may also be changed when the final injector configuration is reached, and thus the offload rare may also have two distinct offload rate limits and associated controls that switch from one rate to the other based upon fuel injector configuration.

One embodiment of a method according to the invention for controlling combustion to improve stability uses three inputs. The first input, Injectors_On, is the number of injectors currently in use. The second input, Brake_temperature, is the current temperature of the brake resistive heating element 828. The third input, Brake_temperature_limit, is the temperature limit of the resistive heating element 828 and will typically be a predetermined, empirically derived value.

A further embodiment of a method for controlling combustion to improve stability may also use three adjustable variables. The first adjustable variable, Offload_Rate_High, represents a highest permissible offload rate. In one embodiment, the default value for this variable may be 5,000 RPM/sec, while the minimum and maximum values may be 0 RPM/sec and 15,000 RPM/sec, respectively. A second adjustable variable, Offload_Rate_Low, represents a lowest permissible offload rate. In one embodiment, the default value for this variable may be 500 RPM/sec, while the minimum and maximum values may be 0 RPM/sec and 1,500 RPM/sec, respectively. A third adjustable variable, Brake_Trim_Kp, relates the temperature of the brake to turbine speed. In one embodiment, the default value for this variable may be 5,000 RPM/° F., while the minimum and maximum values may be 0 RPM/° F. and 15,000 RPM/° F., respectively.

Another embodiment of a method for controlling combustion to improve stability may also a use permanent variable, Offload_Rate_Limit_Transient, to account for an offload rate limit imposed by the temperature of brake resistive heating element 828 at any point during operation of microturbine power generator 800.

Figure 21:
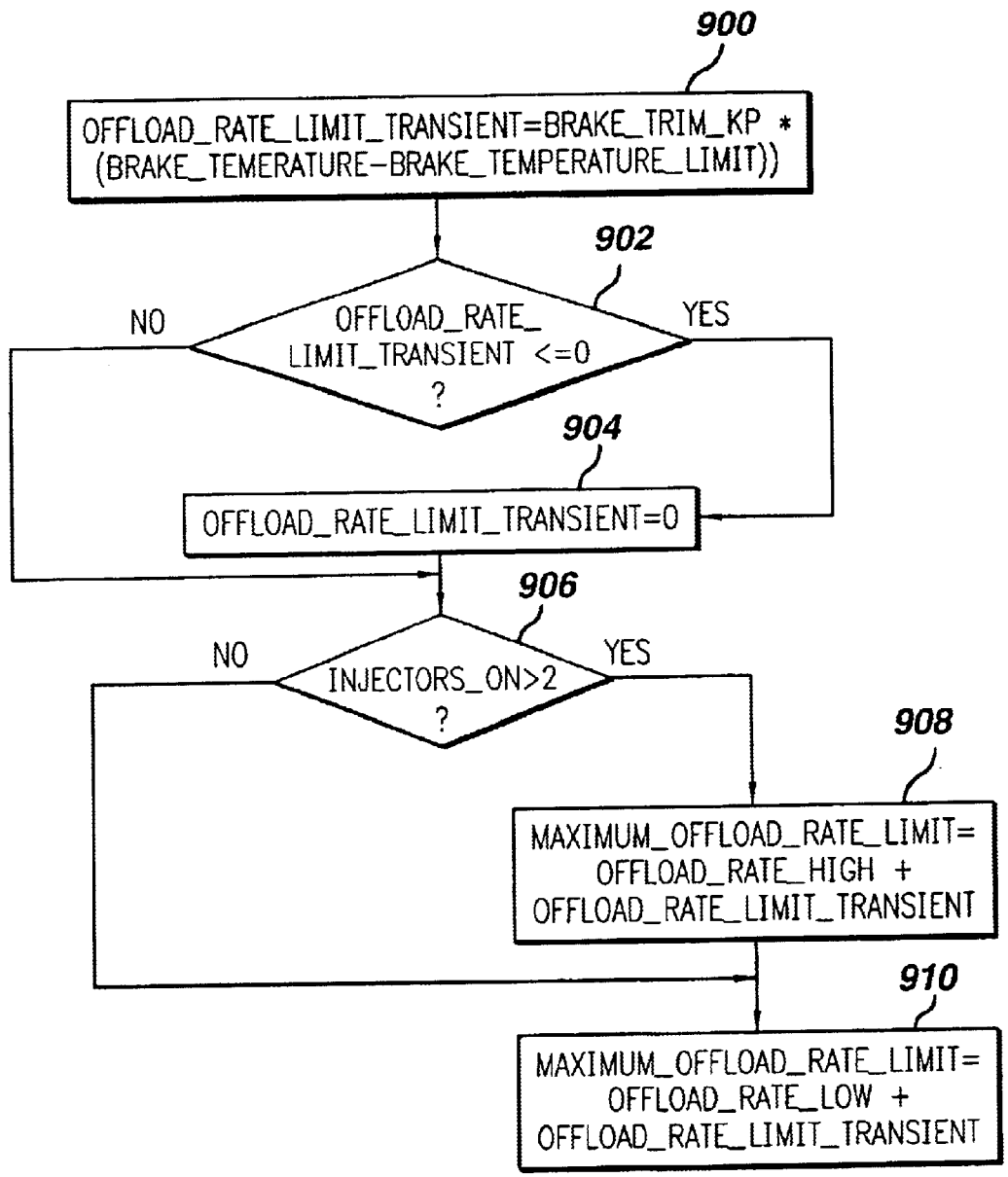
FIG. 21 is a flow chart depicting the preferred steps of a method of maintaining system stability during transient operation.

Referring now to FIG. 21, one embodiment of the above-described method for controlling combustion to improve stability of a microturbine power generator is illustrated in flow chart form. In initial step 900, permanent variable Offload_Rate_Limit_Transient is equated to the product of Brake_Trim_Kp and _(Brake_temperature-Brake_temperature_limit). Then, a determination is at step 902 regarding whether Offload_Rate_Limit_Transient is less than or equal to zero. If Offload_Rate_Limit_Transient is determined to be less than or equal to zero, Offload_Rate_Limit_Transient is equated to zero at step 904. Next, at step 906, it is determined whether the variable Injectors_On is greater than two (i.e. whether two or more than two fuel injectors are currently injecting fuel and air into combustor 722). If Injectors_On is determined to be greater than two, the variable Maximum_Offload_Rate_Limit is equated to the sum of Offload_Rate_High and Offload_Rate_Limit_Transient at step 908. If, alternatively, Injectors_On is determined at step 906 to be less than or equal to two, the variable Maximum_Offload_Rate_Limit is equated to the sum of Offload_Rate_Low and Offload_Rate_Limit_Transient at step 910. The output of this procedure, Maximum_Offload_Rate_Limit, represents the maximum allowed offload rate limit for speed control loop 282 (FIG. 11). The algorithm steps described above are preferably performed by a control loop implemented within power controller 10 (FIG. 1).

Having now described the invention in accordance with the requirements of the patent statutes, those skilled in this art will understand how to make changes and modifications in the present invention to meet their specific requirements or conditions. For example, the power controller, while described generally, may be implemented in an analog or digital configuration. In the preferred digital configuration, one skilled in the art will recognize that various terms utilized in the invention are generic to both analog and digital configurations of power controller. For example, converters referenced in the present application is a general term which includes inverters, signal processors referenced in the present application is a general term which includes digital signal processors, and so forth. Correspondingly, in a digital implementation of the present invention, inverters and digital signal processors would be utilized. Such changes and modifications may be made without departing from the scope and spirit of the invention as set forth in the following claims.

What is claimed is:

1. An integrated turbogenerator system, comprising:

a turbine;

a compressor coupled to said turbine for rotation therewith, said compressor having an inlet portion and an outlet portion to receive air at said inlet portion and to generate compressed air at said outlet portion;

a combustor coupled to said compressor for combusting fuel and the compressed air therein to generate exhaust gas to drive said turbine;

a generator coupled to said turbine for rotation therewith to generate electric power; and an electrically resistive element coupled to said generator and disposed in said compressor upstream of said outlet portion in the normal direction of airflow to selectively dissipate a portion of the generated power as thermal energy in the air channeled through said compressor to said outlet portion.

2. An integrated turbogenerator according to claim 1, wherein said electrically resistive element is disposed in said inlet region of said compressor.

3. An integrated turbogenerator according to claim 2, further comprising:

an air intake disposed in said compressor to channel air over the resistive element and into the compressor.

4. An integrated turbogenerator according to claim 2, further comprising:

a filter disposed in said inlet portion of said compressor between said resistive element and said air intake to filter intake air prior to the air passing over and around said resistive element.

5. An integrated turbogenerator according to claim 2, further comprising:

a controller coupled to said generator and to said resistive element to selectively supply a portion of the generated power from said generator to said resistive element.

6. An integrated turbogenerator according to claim 5, further comprising a power converter coupled to and between said generator and said controller for supplying power from said generator to said controller.

7. An integrated turbogenerator according to claim 5, wherein said generator supplies the generated power to a load, and wherein said controller selectively supplies a portion of the generated power from said generator to said resistive element in accordance with variations in the load.

8. An integrated turbogenerator according to claim 7, wherein said controller controls the speed of said turbine in accordance with variations in the load.

9. An integrated turbogenerator according to claim 5 or 7, wherein said controller controls the speed of said turbine in accordance with a temperature of said resistive element.

10. An integrated turbogenerator according to claim 9, wherein said controller controls the speed of said turbine to maintain a temperature of said resistive element below a preselected value.

11. An integrated turbogenerator according to claim 10, wherein said controller reduces the speed of said turbine in response to a reduction in the load and supplies at least a portion of generated power in excess of the load to said resistive element, the turbine speed being reduced at a rate selected to maintain a temperature of said resistive element below a preselected value.

* * * * *